(12) United States Patent
Ichikawa et al.

(10) Patent No.: US 7,379,115 B2
(45) Date of Patent: May 27, 2008

(54) IMAGE CAPTURING APPARATUS AND IMAGE CAPTURING SYSTEM

(75) Inventors: Tsutomu Ichikawa, Sakai (JP); Makoto Akesaka, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 680 days.

(21) Appl. No.: 11/011,897

(22) Filed: Dec. 14, 2004

(65) Prior Publication Data
US 2005/0140822 A1   Jun. 30, 2005

(30) Foreign Application Priority Data
Dec. 26, 2003   (JP)   ............... 2003-434202

(51) Int. Cl.
*H04N 5/222*   (2006.01)
*G03B 15/03*   (2006.01)

(52) U.S. Cl. ..................... 348/370; 396/157
(58) Field of Classification Search ............ 348/362, 348/367, 370, 371; 396/155, 157, 164, 166, 396/273
See application file for complete search history.

(56) References Cited

U.S. PATENT DOCUMENTS

| | | | | |
|---|---|---|---|---|
| 5,422,702 A | | 6/1995 | Yasukawa | |
| 5,576,798 A | * | 11/1996 | Takagi | 396/159 |
| 6,069,659 A | * | 5/2000 | Nakajima | 348/371 |
| 6,684,028 B2 | * | 1/2004 | Shimada | 396/157 |

FOREIGN PATENT DOCUMENTS

JP    06-250253 A    9/1994

* cited by examiner

*Primary Examiner*—Lin Ye
*Assistant Examiner*—Timothy J Henn
(74) *Attorney, Agent, or Firm*—Sidley Austin LLP

(57) ABSTRACT

A photocurrent corresponding to the intensity of the light from the subject which photocurrent is successively generated at predetermined intervals is converted into a voltage by being logarithmically compressed by a logarithmic compression circuit in a divisional cell of a metering sensor during the preliminary light emission of the flash immediately before the actual shooting. Then, the voltage level is outputted to a controller as an analog metering signal. The controller A/D converts the successively inputted analog metering signal to generate digital data corresponding to the BV value representative of the brightness of the subject under flash light, and stores the digital data into a RAM. Then, the controller calculates a subject distance for determining the light emission amount of the flash in the actual shooting by performing a digital calculation including an integration calculation of the BV values obtained under ambient light and under flash light.

15 Claims, 11 Drawing Sheets

Fig.10
(a)
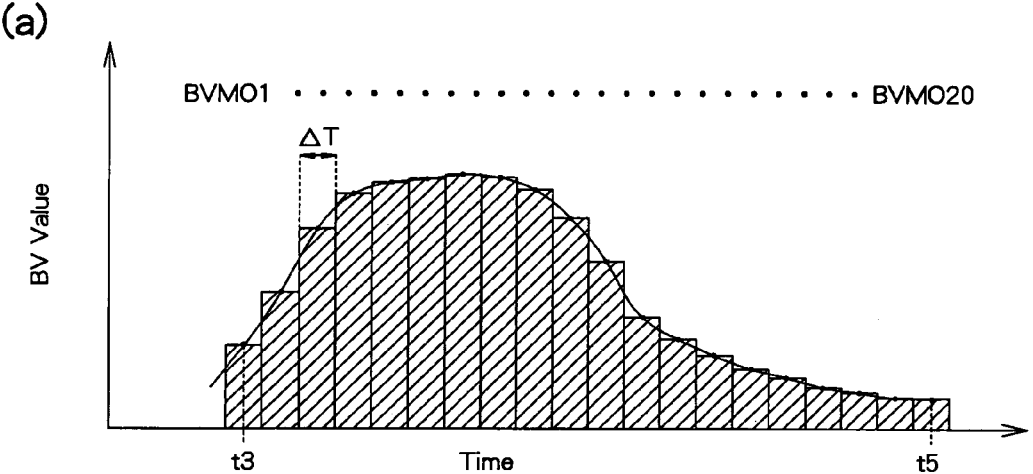
(b)
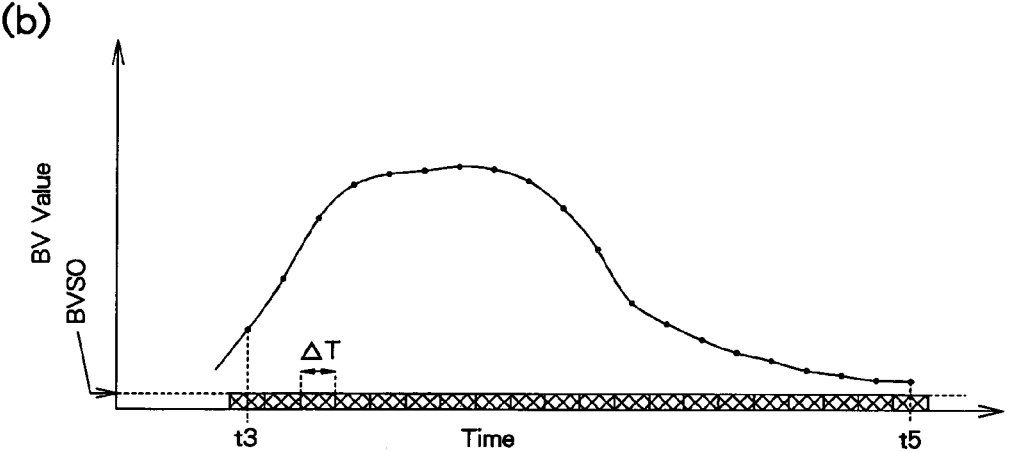
(c)
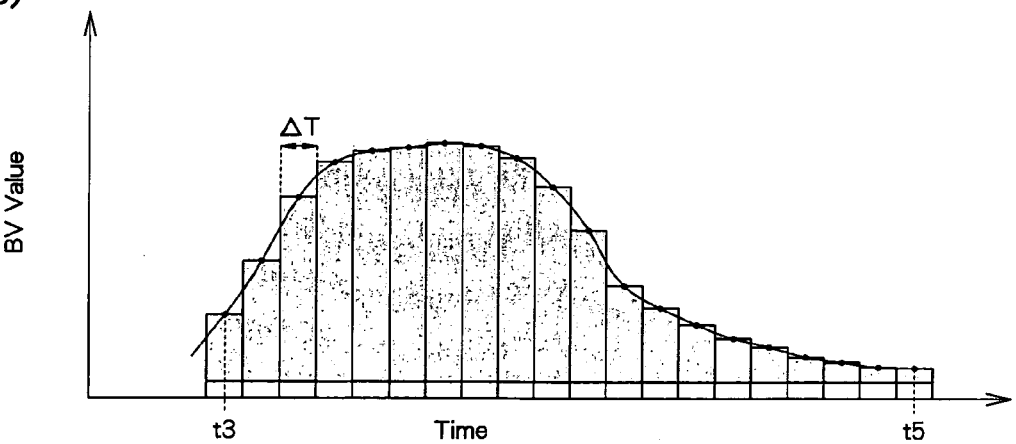

PRIOR ART

IMAGE CAPTURING APPARATUS AND IMAGE CAPTURING SYSTEM

This application is based on the application No. 2003-434202 filed in Japan, the contents of which are hereby incorporated by reference.

BACKGROUND OF THE INVENTION

1. Field of the Invention

The present invention relates to a light adjustment control technology for a single-lens reflex image capturing apparatus.

2. Description of the Related Art

Conventionally, single-lens reflex cameras have been present among both film-based cameras and digital cameras. When shooting with the firing of the flash (flash shooting) is performed by use of a film-based single-lens reflex camera (hereinafter, referred to as "film-based SLR") or a digital single-lens reflex camera (hereinafter, referred to as "digital SLR"), the light emission amount of the flash is appropriately adjusted by use of a light adjustment sensor.

For example, in a conventional film-based SLR, as shown in FIG. 17, when flash shooting is performed, of the flash light, light reflected at the subject (hereinafter, referred to as "reflected flash light") is imaged on the film FL through the taking lens PL1. At this time, the amount of, of the reflected flash light, light reflected at the surface of the film FL is detected by a light adjustment sensor AS1 provided in the vicinity of the bottom of the body of the camera 100 and including an integration circuit comprising a capacitor, so that the light emission amount of the flash can be appropriately adjusted.

On the other hand, in a digital SLR, the surface of a microlens disposed in front of the image sensor substantially regularly reflects the reflected flash light like a mirror-finished surface. For this reason, even if a light adjustment sensor is disposed in a position similar to that in the film-based SLR 100, the light amount that can be detected by the light adjustment sensor is small, so that metering accuracy is low.

Therefore, for example, in the flash shooting, a preliminary flash light emission (hereinafter, referred to as "preliminary light emission") is performed immediately before a shooting operation to obtain an image for recording (hereinafter, referred to as "actual shooting operation") by the image sensor is performed. Then, the amount of reflected flash light in the preliminary light emission is detected to thereby obtain the distance between the subject and the camera, a guide number (GN) necessary for the light emission of the flash in the actual shooting operation (hereinafter, referred to as "actual light emission") is calculated, and the light emission amount in the actual shooting operation (hereinafter, referred to as "actual light emission amount") can be adjusted based on the calculated guide number.

Examples of the method of detecting the amount of reflected flash light include a method in which as shown in FIG. 18, reflected flash light that is incident through the taking lens PL2 and reflected at a reflecting mirror RM2 provided in front of the image sensor IS2 is detected by a light adjustment sensor AS2 including an integration circuit provided in the vicinity of the finder FD2, through a pentaprism PP2 provided in an upper part of the camera 200. Another example is such that as shown in FIG. 19, with a reflecting mirror RM3 being turned up, reflected flash light that is incident through the taking lens PL3 and reflected at the surface of a shutter screen SC3 provided in front of the image sensor IS3 is detected by a light adjustment sensor AS3 including an integration circuit provided in the vicinity of the bottom of the body of the camera 300.

Moreover, a camera has also been proposed that uses one sensor both as the metering sensor for measuring the brightness of the subject and the light adjustment sensor for adjusting the light emission amount of the flash when a shooting without the firing of the flash (hereinafter, referred to as "normal shooting") is performed.

However, in the light adjustment sensors provided in the above-described conventional cameras, an IC circuit including an integration circuit is used to detect the amount of reflected flash light, and the structure of the IC circuit is complicated by the inclusion of the integration circuit, which increases the cost of manufacturing.

A method is considered in which the amount of reflected flash light is detected by use of a monitor output obtained by the light receiving element of the sensor for automatic focusing (AF) control (AF sensor). However, the dynamic range of the light receiving element of the AF sensor is generally narrow. For example, when the initial setting is made so that light adjustment is correctly made when the distance between the subject and the camera is between 1 to 4 m, in a case where a subject only several tens of centimeters away from the camera is shot, light adjustment cannot be correctly made, so that light adjustment accuracy is degraded.

SUMMARY OF THE INVENTION

The present invention is made in view of the above-mentioned problem, and an object thereof is to provide an image capturing apparatus and an image capturing system being inexpensive and capable of: highly accurately controlling flash light adjustment.

To attain the above-mentioned object, an image capturing apparatus according to the present invention comprises: a metering sensor for measuring a brightness of a subject; a light emitter; a light emitting controller for controlling the light emitter to perform a preliminary light emission of a predetermined light amount before a shooting; a data generator for generating a plurality of pieces of digital metering data by converting to digital form in time sequence an analog metering signal outputted from the metering sensor while varying with time during the preliminary light emission; a memory for storing the plurality of pieces of digital metering data successively generated by the data generator; and a calculator for calculating a light emission amount for the shooting by a digital calculation including an integration calculation of the plurality of pieces of digital metering data stored in the memory.

According to the present invention, an image capturing apparatus can be provided that is inexpensive and capable of highly accurate flash light adjustment control.

BRIEF DESCRIPTION OF THE DRAWINGS

In the following description, like parts are designated by like reference numbers throughout the several drawings.

FIGS. 10(a) to 10(c) are views of assistance in explaining the calculation of a reflected light amount component of the flash light;

DETAILED DESCRIPTION OF THE PREFERRED EMBODIMENT

Hereinafter, an embodiment of the present invention will be described with reference to the drawings.

<General Outline of the Image Capturing System>

Figure 1:
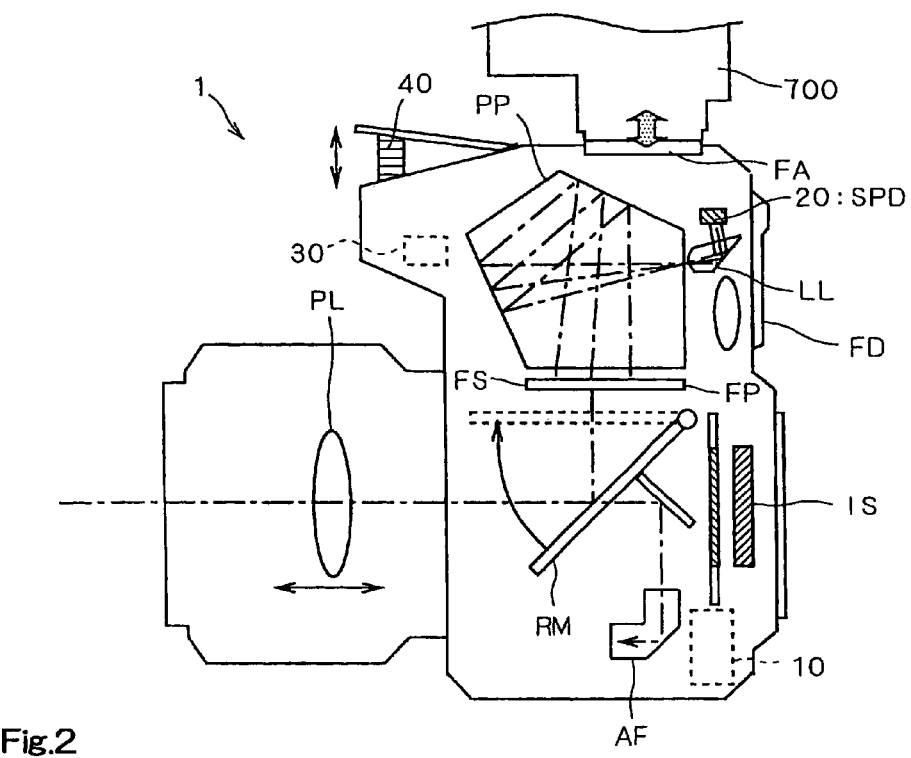
FIG. 1 is a cross-sectional view showing the general outline of a image capturing system according to an embodiment of the present invention.

FIG. 1 is a cross-sectional view showing the general outline of a image capturing system 500 according to the embodiment of the present invention. In FIG. 1, a cross section viewed from a side of the image capturing system 500 is shown.

As shown in FIG. 1, the image capturing system 500 comprises an image capturing apparatus 1 and an external flash device 700.

The image capturing apparatus 1 is structured as a digital camera which is an example of the single-lens reflex camera.

The image capturing apparatus 1 mainly comprises a quick return mirror RM, a taking lens PL, a pentaprism PP, an image sensor IS, a built-in flash 40, a flash light emission circuit 30, a first controller 10 and a metering sensor 20.

The quick return mirror RM is provided so as to be shiftable between a condition of being turned down (mirror down condition) shown by the solid line in FIG. 1 and a condition of being turned up (mirror up condition) shown by the doted line like typical quick return mirrors.

When the user decides the composition before shooting, the quick return mirror RM is set in the mirror down condition, and light from the subject that is incident through the taking lens PL is reflected at the quick return mirror RM to be imaged on the focal plane FP of the focusing screen FS. The subject image formed on the focal plane FP is converted into an erect image through the pentaprism PP, and the erect image can be viewed through the finder FD. A metering lens LL disposed in the vicinity of the finder FD is structured so that the focal plane FP and the light receiving surface of a light receiving portion of the metering sensor 20 are conjugate with each other. The optical image formed on the focal plane FP is projected onto the metering sensor 20 so as to be scaled down.

The metering sensor 20 measures light mainly comprising visible rays emanating from the subject, by use of a light receiving element. That is, the metering sensor 20 measures the amount of light (brightness) impinging on the subject to be shot, that is, the brightness of the subject (subject brightness).

In the metering sensor 20 in which the light receiving portion is divided into a plurality of areas, the optical image according to the subject is divided into a plurality of metering areas, and the metering value is individually obtained with respect to each of the metering areas. The metering sensor 20 will be further described later.

Normally, the metering sensor for measuring the subject brightness in shooting under ambient light and the light adjustment sensor that determines the light emission amount of the flash by measuring the light from the subject when shooting is performed with the firing of the flash are separately provided. However, in the image capturing apparatus 1 according to the present embodiment, the light adjustment sensor is not specifically provided, and the measurement of the subject brightness under ambient light and the metering for light adjustment control to determine the light emission amount of the flash at the time of shooting are realized by a single metering sensor 20.

The central part of the quick return mirror RM is semi-transparent. The light having passed through the central part of the mirror RM is reflected at a reflection mirror M2 to be incident on the focus detector AF. Focusing is performed by driving the focusing lens portion of the taking lens PL by a non-illustrated driving mechanism based on the defocus amount detected by the focus detector AF.

In the mirror up condition, the image sensor IS receives light from the subject through the taking lens PL and photoelectrically converts the received light to thereby obtain the image data according to the subject. That is, a shooting (actual shooting) operation to obtain the image data according to the subject is performed by the image sensor IS.

The built-in flash 40 is provided so as to be shiftable between a condition of being housed in the body of the image capturing apparatus 1 (housed condition) and a condition of popping up so as to protrude from the body (pop-up condition). The light emission amount of the built-in flash 40 is controlled by the flash light emission circuit 30 based on a trigger signal from the first controller 10.

The external flash device 700 is externally attached, so as to be detachable, to a flash attachment portion FA of the image capturing apparatus 1. In this description, when the external flash device 700 is attached to the flash attachment portion FA, signal transmission is enabled between the first controller 10 and the external flash device 700, so that shooting can be performed while light emission by the external flash device 700 is performed based on a signal from the first controller 10.

When the external flash device 700 is detached from the flash attachment portion FA, the image capturing apparatus 1 is enabled to perform shooting while performing light emission by the built-in flash 40.

Hereinafter, shooting the subject with the firing of the built-in flash 40 or the external flash device 700 will be referred to as flash shooting.

<Functional Structure of the Image Capturing Apparatus>

Figure 2:
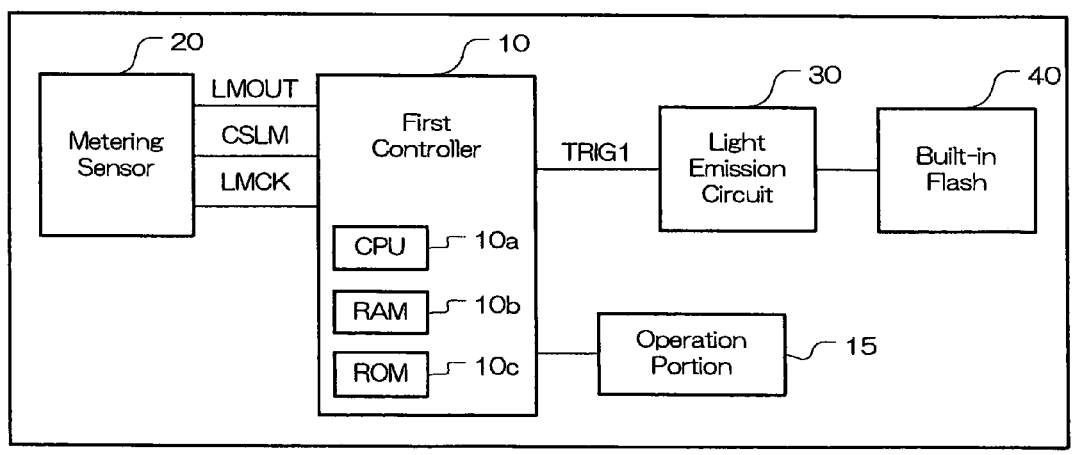
FIG. 2 is a block diagram showing a functional structure of an image capturing apparatus according to the embodiment of the present invention.

FIG. 2 is a block diagram showing a functional structure of the image capturing apparatus 1. In FIG. 2, the functional structure associated with the control to adjust the light emission amount of the built-in flash 40 (light adjustment control) is shown.

The first controller 10 comprises a CPU 10a, a RAM 10b and a ROM 10c, and controls various shooting operations based on the signal from an operation portion 15 including the shutter button. The shutter button is a two-stroke push button switch the following two different conditions of which can be detected: a condition of being half depressed by the user (hereinafter, referred to also as S1 condition); and a condition of being fully depressed (hereinafter, referred to also as S2 condition). When the shutter button is brought into the half depressed (S1) condition in a case where the image capturing apparatus 1 is set in a mode to perform shooting (shooting mode), automatic focusing control or the like is started, and when the shutter button is brought into the fully depressed (S2) condition, an operation of the actual shooting to take an image for recording is started. That is, when the shutter button is in the S1 condition, the image capturing apparatus 1 is in a condition of making preparations for the actual shooting, and when the shutter button is in the S2 condition, the image capturing apparatus 1 is in a condition where an instruction to start the actual shooting is provided.

In the flash shooting described later, when the shutter button is in the S1 condition, light from the subject under ambient light is received by the metering sensor 20 to measure the brightness of the subject. When the shutter button is in the S2 condition, light from the subject during the preliminary light emission is received by the metering sensor 20 to measure the brightness of the subject, and the light adjustment control to determine the light emission amount in the light emission at the time of the actual shooting is performed based on the measured subject brightness.

The first controller 10 transmits to the metering sensor 20 signals such as a signal CSLM (chip select light measurement signal) to activate the metering operation by the metering sensor 20 and a clock LMCK (light measurement clock) for specifying by which divisional area metering is performed. Further, by the first controller 10 outputting a trigger signal TRIG1 to provide an instruction to perform light emission to the flash light emission circuit 30, the light emission timing and light emission amount of the built-in flash 40 can be appropriately controlled by the flash light emission circuit 30.

In the first controller 10, various functions can be realized by executing programs stored in the ROM 10c comprising a flash memory or the like, by the CPU 10a.

The metering sensor 20 has a light receiving portion where a plurality of light receiving elements (for example, silicon photodiodes: SPDs) that receives the optical image according to the subject.

Figure 3:
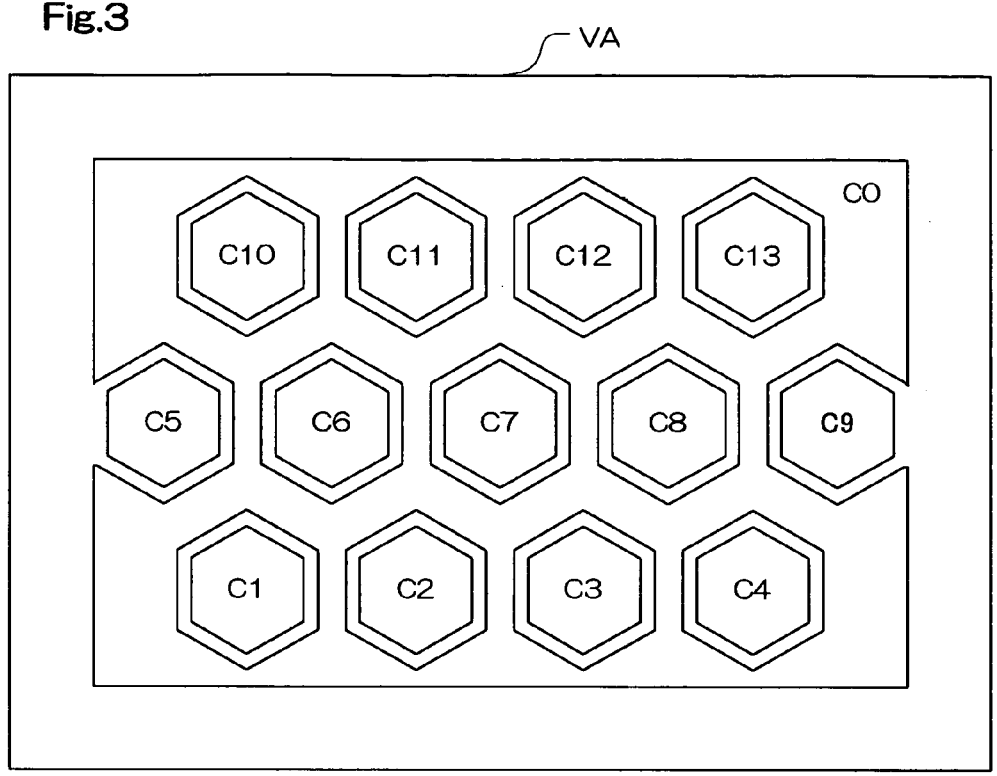
FIG. 3 is a view of assistance in explaining the disposition of divisional cells of a metering sensor.

FIG. 3 shows the light receiving surface of the light receiving portion of the metering sensor 20 viewed from the front. As shown in FIG. 3, the light receiving portion of the metering sensor 20 is divided into fourteen areas (also referred to as "cells" or "divisional cells") C0 to C13, and the metering of the optical image VA according to the subject received by the light receiving portion can be performed with the optical image VA being divided into fourteen areas.

Figure 4:
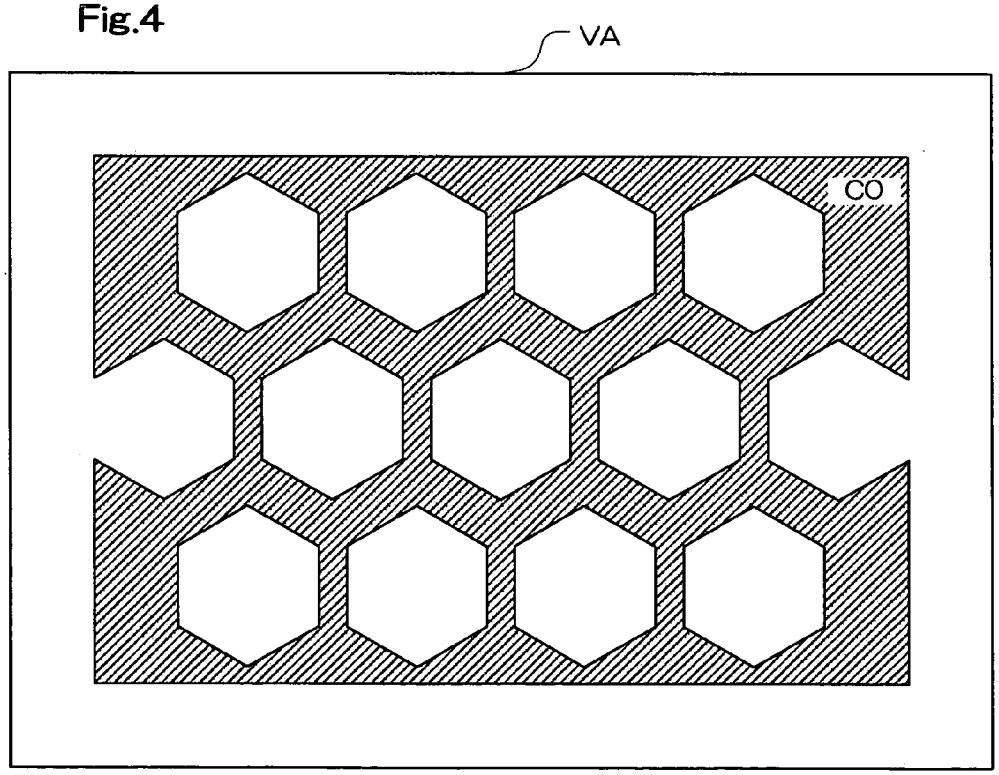
FIG. 4 is a view of assistance in explaining the disposition of the divisional cells of the metering sensor.

In this description, for example, as shown in FIG. 3, the substantially regularly hexagonal divisional cells C1 to C13 are arranged in three layers so as to adjoin one another, and the divisional cell C0 is disposed in the area including the area between the layers and the periphery. FIG. 4 clarifies the disposition of the divisional cell C0 when the light receiving surface of the light receiving portion of the metering sensor 20 is viewed from the front, and the hatched part in the figure shows the disposition of the divisional cell C0. As shown in FIG. 4, the divisional cell C0 has a relatively large light receiving area compared to the other divisional cells C1 to C13, and is disposed so that a comparatively large area of the optical image VA is the object of metering.

Figure 5:
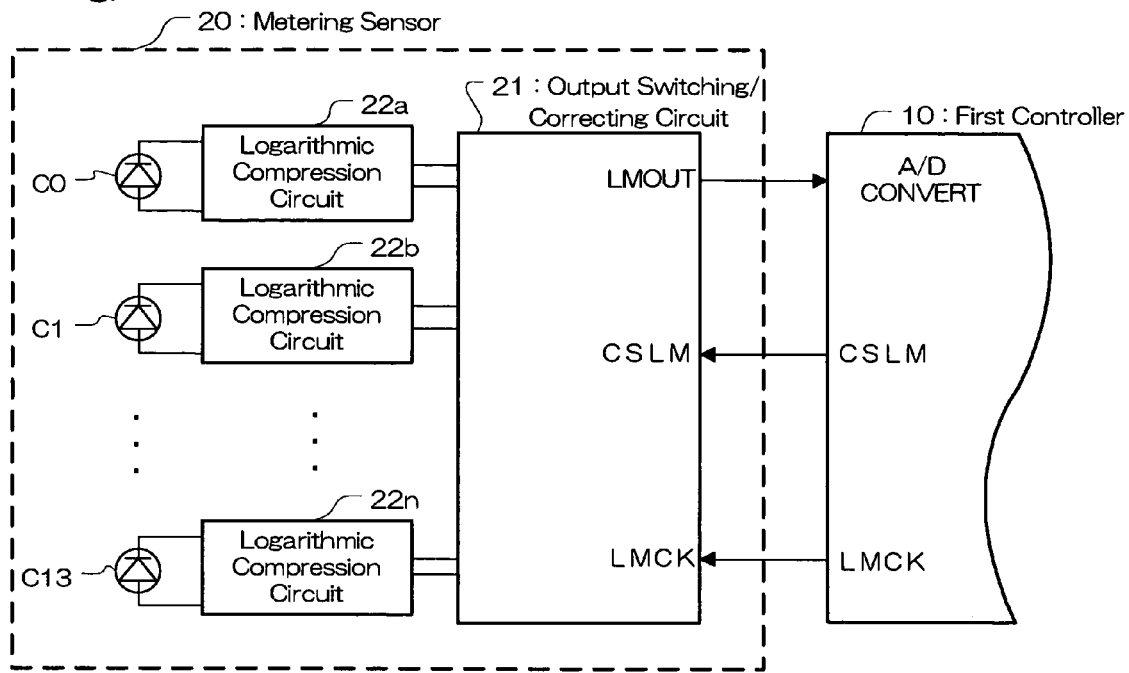
FIG. 5 is a block diagram showing another functional structure of the image capturing apparatus according to the embodiment of the present invention.

FIG. 5 is a block diagram showing a functional structure associated with the metering sensor 20. As shown in FIG. 5, the metering sensor 20 has the fourteen divisional cells C0 to C13, and is structured so that so-called multi-segment metering can be performed in which the metering of the optical image according to the subject received by the light receiving portion is performed with the optical image being divided into fourteen areas based on the signals outputted from the light receiving elements disposed in the divisional cells.

Moreover, in the metering sensor 20, typical logarithmic compression circuits 22a to 22n each comprising an operational amplifier or the like are provided for the divisional cells C0 to C13. In this description, a photocurrent proportional to the intensity of the light received by each of the divisional cells C0 to C13 is generated, and the generated currents are logarithmically compressed by the logarithmic compression circuits 22a to 22n to be converted into voltages and are outputted to an output switching/correcting circuit 21. Then, the voltages are appropriately corrected by the output switching/correcting circuit 21 and are outputted to the first controller 10 as analog signals LMOUT (light measurement output signals).

That is, the light receiving portion of the metering sensor 20 is divided into a plurality of cells (divisional areas), and the metering sensor 20 outputs analog metering signals that vary with time in accordance with the intensity of the light from the subject received by the divisional areas.

Figure 6:
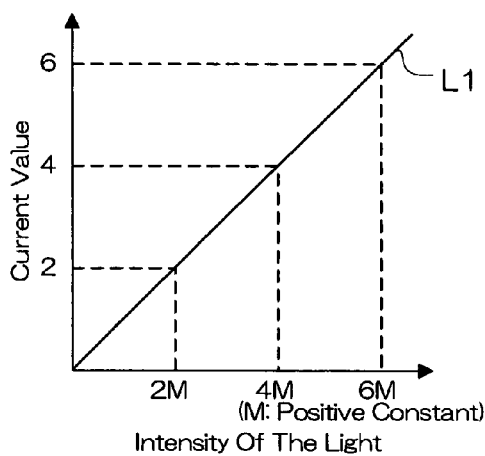
FIGS. 6 and 7 are views of assistance in explaining a logarithmic compression processing by the metering sensor.
Figure 7:
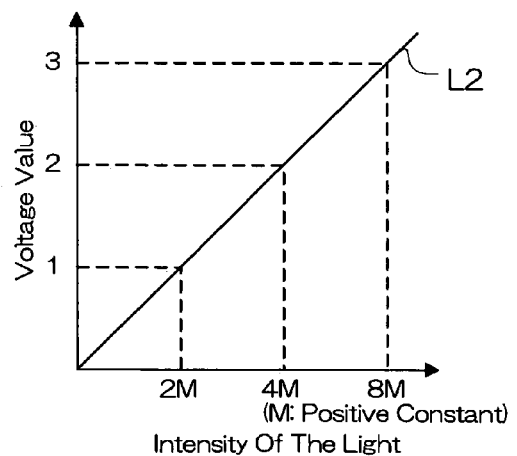

FIGS. 6 and 7 are views of assistance in explaining the logarithmic compression processing by the logarithmic compression circuits 22a to 22n. In the figures, M represents a positive constant.

FIG. 6 shows a relationship (straight-line L1) between the intensity of the light received by the divisional cells C0 to C13 (lateral axis) and the current value corresponding to the outputs from the divisional cells C0 to C13 (longitudinal axis). In FIG. 6, the light intensity and the current value are proportional to each other.

FIG. 7 shows a relationship (straight line L2) between the intensity of the light received by the divisional cells C0 to C13 (lateral axis) and the voltage value obtained by logarithmically compressing the current value corresponding to the outputs from the divisional cells C0 to C13 (longitudinal line). In FIG. 7, the current value is compressed, for example, to a logarithm to the base 2 to thereby obtain the voltage value. That is, in the logarithm compression circuits 22a to 22n, the logarithmic compression processing is performed, for example, so that the relationship of the following expression (1) holds:

$$E = \log_2 I \qquad (1)$$

where the inputted current value is I and the outputted voltage value is E.

Moreover, in the metering sensor 20, the selection of the divisional cell whose metering signal LMOUT is to be transmitted to the first controller 10 is controlled by the output switching/correcting circuit 21 receiving the clock LMCK from the first controller 10. In this description, the divisional cell to output the metering signal. LMOUT is successively switched every time one clock LMCK is transmitted from the first controller 10 to the output switching/correcting circuit 21. For example, when the clock LMCK is transmitted from the first controller 10 to the output switching/correcting circuit 21 under a condition where the metering signal LMOUT of the divisional cell Cn (n is an integer from 0 to 13) is transmitted, the metering sensor 20 is shifted to a condition where the metering signal LMOUT of the divisional cell Cn+1 (n+1 is an integer from 0 to 13) is transmitted.

Moreover, in the first controller 10, a digital conversion processing (A/D conversion processing) to convert the analog metering signal LMOUT outputted from the metering sensor 20 to a digital signal (data representative of a BV value which is an APEX value representative of the subject brightness) is performed to thereby generate digital metering data.

In the shooting under ambient light without the firing of the built-in flash 40 or the external flash device 700 (normal shooting), automatic exposure control is realized by detecting the BV value by A/D-converting the metering signal LMOUT from the metering sensor 20 in the first controller 10.

In the flash shooting with the firing of the built-in flash 40, before the actual shooting, the actual light emission amount in the actual shooting is obtained by the first controller 10 based on the metering signal LMOUT under ambient light and the metering signal LMOUT obtained at the time of the preliminary light emission of the built-in flash 40.

Then, at the timing of the actual shooting, the trigger signal TRIG1 is outputted from the first controller 10 to the flash light emission circuit 30 based on the obtained actual light emission amount, whereby appropriate light adjustment control is performed.

<Light Adjustment when the Built-in Flash is Used>

Figure 8:
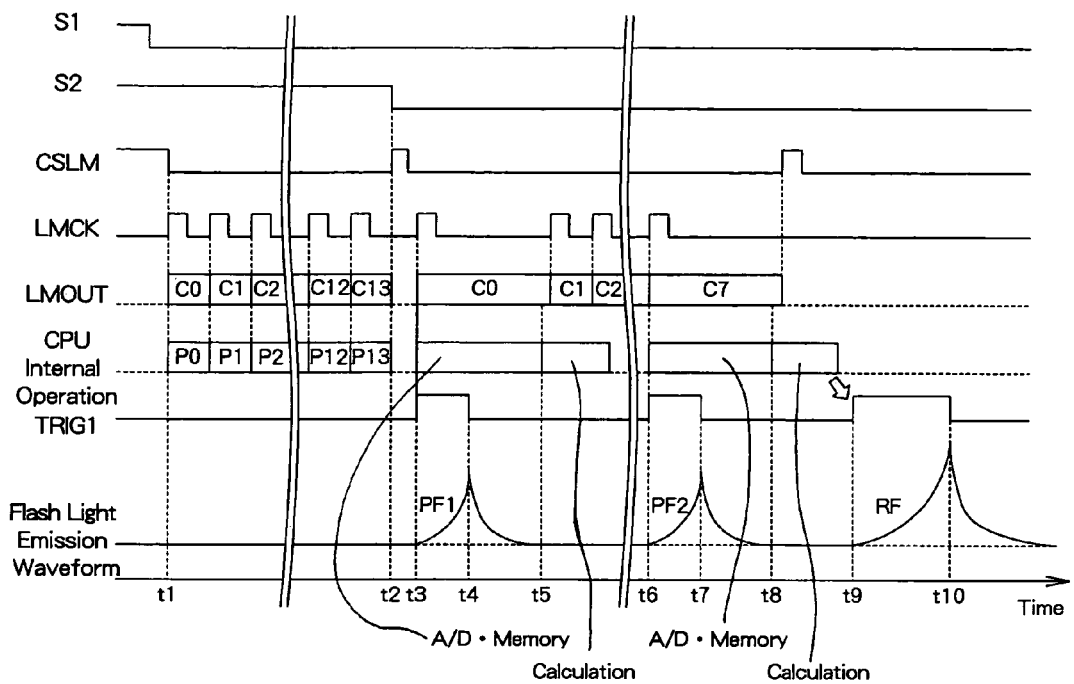
FIG. 8 is a timing chart showing the flow of a light adjustment control operation of a built-in flash.

FIG. 8 is a timing chart showing the flow of a light adjustment control operation to adjust the actual light emission amount in the flash shooting using the built-in flash 40. This light adjustment control operation flow is realized by the first controller 10 executing a program stored in the ROM 10c. Moreover, the aperture value (FNo) at the time of the light adjustment control is set to a preset given value.

To perform the multi-segment metering using a predetermined number of divisional cells by the metering sensor 20 at the time of the preliminary light emission for determining the actual light emission amount, it is necessary to perform a predetermined number of preliminary light emissions and perform metering by each divisional cell in each preliminary light emission. Since the light emission of the built-in flash 40 is controlled by the flashlight emission circuit 30, the flash light emission circuit 30 controls the built-in flash 40 so as to perform a plurality of number of light emissions before the actual light emission for the actual shooting. In this description, metering using two divisional cells C0 and C7 is performed (hereinafter, referred to as "pseudo two-segment metering").

That is, during the two preliminary light emissions by the built-in flash 40, the metering sensor 20 outputs to the first controller 10 the analog metering signal of, of the plurality of divisional cells C0 to C13, the divisional cell C0 whose object of metering is a subject being present in a relatively wide area and that occupies the largest area of the light receiving surface of the light receiving portion and the analog metering signal of the divisional cell C7 disposed in the vicinity of the substantial center of the light receiving surface of the metering sensor 20, that is, the divisional cell C7 performing metering-with respect to the substantial center of the optical image according to the subject. Then, the first controller 10 successively converts the inputted analog metering signals to digital form to thereby generate digital metering data.

With reference to FIG. 8, the light: adjustment control operation flow will be described.

As shown in FIG. 8, when the user half depresses the shutter button (S1 condition) under a condition where the image capturing apparatus 1 is in the shooting mode, the level of the signal CSLM transmitted from the first controller 10 to the metering sensor 20 is changed from high to low, so that the metering sensor 20 starts the metering operation (time t1).

When the metering sensor 20 is activated, the clock LMCK which is a predetermined periodical signal is outputted from the first controller 10 to the metering sensor 20. While the divisional cell that outputs the metering signal LMOUT is successively switched in accordance with the number of clocks LMCK inputted to the metering sensor 20, the metering signals LMOUT (the voltage level corresponding to the subject brightness) of the divisional cells C0 to C13 are outputted from the metering sensor 20 to the first controller 10. At this time, in the CPU 10a of the first controller 10, the inputted metering signals LMOUT are A/D-converted into digital data (BV value), and stored into the incorporated RAM 10b (processes P1 to P13). In this series of metering operations, since the built-in flash 40 does not emit light, the brightness of the subject under ambient light is measured. This series of metering operations is repeated while the shutter button is in the S1 condition (times t1 to t2).

Then, when the user fully depresses the shutter button into the S2 condition, the level of the signal CSLM transmitted from the first controller 10 to the metering sensor 20 is momentarily changed from low to high and is soon returned to low. This level transition of the signal CSLM resets the number of clocks LMCK. Then, by the clock LMCK being outputted from the first controller 10 to the metering sensor 20, the divisional cell that outputs the metering signal LMOUT becomes the divisional cell C0 (times t2 to t3). Then, the metering signal LMOUT from the metering sensor 20 is outputted as a voltage level obtained by logarithmically compressing the current corresponding to the intensity of the light received by the divisional cell C0.

When the divisional cell that outputs the metering signal LMOUT becomes the divisional cell C0, the trigger signal TRIG1 outputted from the first controller 10 to the flash light emission circuit 30 becomes high, so that the first preliminary light emission by the built-in flash 40 is started (time t3). Then, after the trigger signal TRIG1 is held high for a predetermined period in accordance with the preset light emission amount (specifically, the guide number) of the preliminary light emission, the trigger signal TRIG1 becomes low to end the first preliminary light emission.

The light emission waveform (the waveform representative of the intensity of the emitted light) in the first preliminary light emission is such that, like the waveform PF1 shown in FIG. 8, the intensity of the emitted light gradually increases while the trigger signal TRIG1 is held high (times t3 to t4) and when the trigger signal TRIG1 becomes low, the intensity gradually decreases to end the first preliminary light emission. While the guide number of the preliminary light emission can be changed according to the period of time for which the trigger signal is high, typically, the guide number is approximately 2.8 to 5.6.

During the period of the first preliminary light emission, in the metering sensor 20, the divisional cell that outputs the metering signal LMOUT is the divisional cell C0. At least while the built-in flash 40 is emitting light, the metering signal LMOUT is outputted at predetermined time intervals, and the first controller 10 repeats the operation to successively A/D-convert the metering signal LMOUT and store it into the RAM 10b (times t3 to t5).

Figure 9:
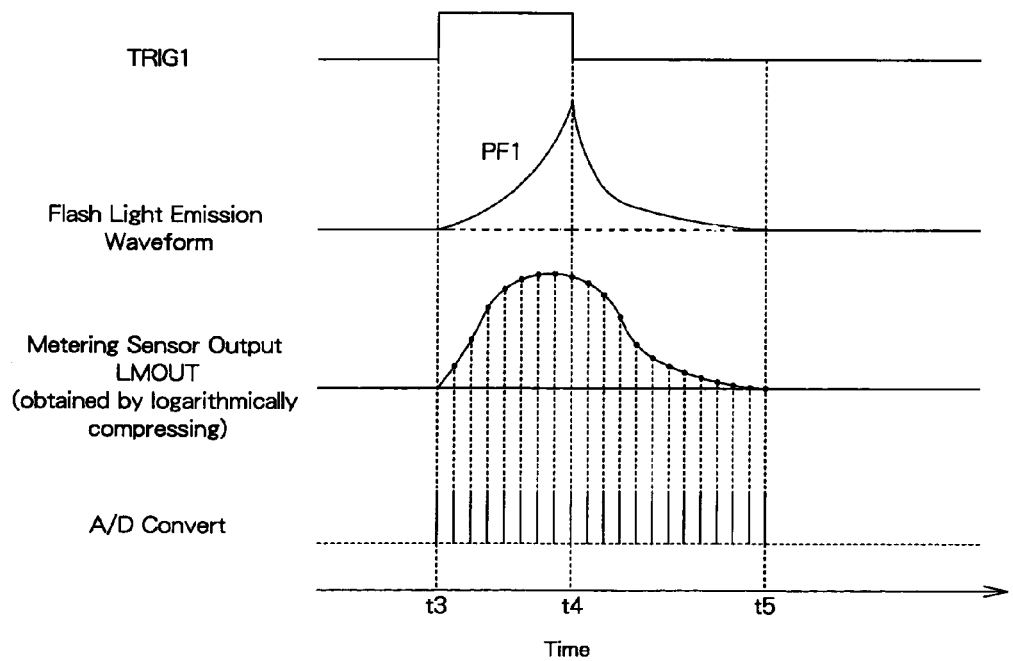
FIG. 9 is a timing chart of assistance in explaining an operation to successively A/D-convert and store an output signal from the metering sensor.

FIG. 9 is a timing chart of assistance in explaining the operation to successively A/D-convert the metering signal LMOUT and store it into the RAM 10b during the period of the first preliminary light emission. As shown in FIG. 9, the light emission waveform of the first preliminary light emission is like the waveform PF1 in accordance with the period of time for which the trigger signal TRIG1 is high. At this time, the metering signal LMOUT is successively outputted from the metering sensor 20 at predetermined intervals ΔT, and is A/D-converted and stored into the RAM 10b every time. That is, in this description, instead of accumulating charges in a capacitor based on the photocurrent obtained in accordance with the brightness of the subject and measuring the amount of reflected light from the subject at the time of flash emission, the brightness of the subject is treated as a voltage value at each moment in real time in the metering sensor 20. Since this makes it unnecessary that the metering sensor 20 include an integration circuit that accumulates charges in the capacitor based on the photocurrent, the circuit structure of the metering sensor 20 can be simplified, so that the cost of manufacturing of the image capturing apparatus 1 can be reduced.

After the end of the first preliminary light emission, the CPU 10a in the first controller 10 performs a calculation processing to calculate the distance (subject distance) D0 from the image capturing apparatus 1 to the subject based on the BV value under ambient light obtained when the shutter button is in the S1 condition and the BV value representative of the subject brightness which BV value is stored in the RAM 10b at the time of the first preliminary light emission. The method of calculating the subject distance D0 will be described later.

On the other hand, in parallel with the subject distance calculation processing based on the first preliminary light emission, the clock LMCK is successively outputted from the first controller 10 to the metering sensor 20, and the divisional cell that outputs the metering signal LMOUT becomes the divisional cell C7 (time t6). Then, the metering signal LMOUT from the metering sensor 20 is outputted as the voltage level obtained by logarithmically compressing the photocurrent corresponding to the intensity (brightness) of the light received by the divisional cell C7.

When the divisional cell that outputs the metering signal LMOUT becomes the divisional cell C7, the trigger signal TRIG1 outputted from the first controller 10 to the flash light emission circuit 30 becomes high, so that the second preliminary light emission by the built-in flash 40 is started (time t6). Then, after the trigger signal TRIG1 is held high for a predetermined period in accordance with the preset light emission amount (specifically, the guide number) in the preliminary light emission, the trigger signal TRIG1 becomes low to end the second preliminary light emission. In this description, the guide number is set so that the light emission amounts in the first and second preliminary light emissions are substantially the same.

The light emission waveform in the second preliminary light emission is such that, similarly to the light emission waveform in the first preliminary light emission, like the waveform PF2 shown in FIG. 8, the intensity of the emitted light gradually increases while the trigger signal TRIG1 is held high (times t6 to t7) and when the trigger signal TRIG1 becomes low, the intensity gradually decreases to end the second preliminary light emission.

During the period of the second preliminary light emission, in the metering sensor 20, the divisional cell that outputs the metering signal LMOUT is the divisional cell C7, and like in the first preliminary light emission, the metering signal LMOUT is successively outputted at predetermined intervals ΔT while the built-in flash 40 is emitting light. Then, the first controller 10 repeats the operation to successively A/D-convert the metering signal LMOUT and store it into the RAM 10b (times t6 to t8).

Thus, in the first and second preliminary light emissions by the built-in flash 40, the first controller 10 converts to digital form in time sequence the analog metering signal outputted from the metering sensor 20 while varying with time in accordance with the intensity of the light from the subject received by the divisional cells C0 and C7 that are different from each other, thereby generating a plurality of pieces of digital metering data corresponding to the subject brightness.

After the end of the second preliminary light emission, the CPU 10a in the first controller 10 performs a calculation processing to calculate the distance (subject distance) D7 from the image capturing apparatus 1 to the subject based on the BV value under ambient light obtained when the shutter button is in the S1 condition and the BV value stored in the RAM 10b at the time of the second preliminary light emission. The method of calculating the subject distance D7 will be described later.

When the subject distance D7 is obtained, the CPU 10a of the first controller 10 performs a predetermined weight assignment processing on the two subject distances D0 and D7, and performs a calculation processing to calculate a subject distance Da. The method of calculating the subject distance Da will also be described later.

Moreover, in this description, since the guide number (GN) in the preliminary light emission and the aperture value (FNo) are preset values and the subject distance Da is obtained as described above, by performing a calculation applying these values to the following generally known expression (2) for calculating the guide number of the actual light-emission by the CPU 10a of the first controller 10, the actual light emission amount (in this description, the guide number) is calculated:

$$GN = FNo \times Da \quad (2)$$

Then, the trigger signal TRIG1 is outputted from the first controller 10 to the flash light emission circuit 30 for a period based on the guide number of the actual light emission calculated as described above (times t9 to t10), whereby the light adjustment control of the actual light emission by the built-in flash 40 is realized. FIG. 8 shows the light emission waveform RF of the actual light emission.

<Method of Calculating the Subject Distance Da>

When the APEX value of the subject brightness under ambient light is BVS, the APEX value of the subject brightness in the preliminary light emission is BVM, the guide number that defines the light emission amount in the preliminary light emission is GNp and the subject distance is D, the relationship of the following expression (3) holds:

$$D = 0.1868 \times GNp / \sqrt{\{\int (2^{BVM} - 2^{BVS}) dt\}} \quad (3)$$

Moreover, since metering is performed with the divisional cell C0 in the first preliminary light emission, when the APEX value of the subject brightness under ambient light is BVS0, the APEX value of the subject brightness in the first preliminary light emission is BVM0 and the subject distance is D0 in a case where metering is performed with the divisional cell C0, the relationship of the following expression (4) holds:

$$D0 = 0.1868 \times GNp / \sqrt{\{\int (2^{BVM0} - 2^{BVS0}) dt\}} \quad (4)$$

Moreover, since metering is performed with the divisional cell C7 in the second preliminary light emission, when the APEX value of the subject brightness under ambient light is BVS7, the APEX value of the subject brightness in the second preliminary light emission is BVM7 and the subject distance is D7 in a case where metering is performed with the divisional cell C7, the relationship of the following expression (5) holds:

$$D7 = 0.1868 \times GNp / \sqrt{\{\int (2^{BVM7} - 2^{BVS7}) dt\}} \quad (5)$$

Paying attention now to the inside of the radical signs of the expressions (4) and (5), by performing a logarithmic expansion processing in the opposite direction to the logarithmical compression processing by the metering sensor, the BV values at the time of the preliminary light emission and under ambient light are converted to values proportional to the intensity of the light from the subject, and by integrating the difference between the logarithmically expanded BV values at the time of the preliminary light emission and under ambient light, the amount of, of the light emitted from the built-in flash 40 at the time of the preliminary light emission, light reflected from the subject (reflected light amount component of the flash light) is calculated. That is, from a different viewpoint, the reflected light amount component of the flash light is calculated by subtracting the amount of light emanating from the subject under ambient light (reflected light amount component of the ambient light) from the amount of light obtained by integrating the intensity of the light emanating from the subject at the time of the preliminary light emission.

The inside of the radical signs of the expressions (4) and (5) can be calculated if BVM0 and BVM7 are continuously obtained. In the image capturing apparatus 1, however, since BVM0 and BVM7 are obtained at predetermined intervals $\Delta T$ in the preliminary light emission, the subject distances D0 and D7 can be approximately calculated by the following expressions (6) and (7) for approximately calculating the reflected light amount component of the flash light. In this description, the values (BV values) obtained by A/D-converting the i-th (for example, i=1,2,3, . . . ,20) metering signals LMOUT from the metering sensor 20 at the time of the first and second preliminary light emissions are BVM0$i$ and BVM7$i$, respectively.

$$D0 \approx 0.1868 \times GNp / \sqrt{\sum_{i=1}^{20} \{\Delta T \times (2^{BVM0i} - 2^{BVS0})\}} \quad (6)$$

$$D7 \approx 0.1868 \times GNp / \sqrt{\sum_{i=1}^{20} \{\Delta T \times (2^{BVM7i} - 2^{BVS7})\}} \quad (7)$$

That is, in this description, the reflected light amount component-of the flash light can be calculated by an appropriate integration calculation, and the subject distances D0 and D7 can be approximately obtained by the expressions (6) and (7).

Now, the approximate integration calculation of the reflected light amount component of the flash light in the expressions (6) and (7) will be described.

FIGS. 10(a) to 10(c) are views of assistance in explaining the calculation of the reflected light amount component of the flash light. In these figures, the lateral axis represents time and the longitudinal axis represents the BV value. Since the methods of calculating the reflected light amount component of the flash light from the BV values corresponding to the divisional cells C0 and C7 are similar to each other, in this description, the calculation method associated with the divisional cell C0 will be described as an example.

As shown in FIG. 10(a), BVM0$i$ based on the metering signal LMOUT from the metering sensor 20 is stored into a memory at intervals $\Delta T$ (t3 to t5). Therefore, by multiplying each BVM0$i$ by $\Delta T$ and adding the results together, the amount of reflected light from the subject in the first preliminary light emission (corresponding to the hatched part) can be approximately calculated. Moreover, as shown in FIG. 10(b), the intensity of, of the light from the subject in the preliminary light emission, the light resulting from ambient light is constant at BVS0. Therefore, by multiplying each BVS0 by $\Delta T$ and adding the results together (in this description, BVS0×$\Delta T$×20), the reflected light amount component of the ambient light in the first preliminary light emission (corresponding to the hatched part) can be calculated. Then, as shown in FIG. 10(c), by subtracting the reflected light amount component of the ambient light from the amount of reflected light from the subject in the first preliminary light emission, the reflected light amount component of the flash light in the first preliminary light emission (corresponding to the hatched part) can be approximately calculated.

A method of obtaining the subject distances D0 and D7 by a digital calculation including the approximate integration calculation as shown in the expressions (6) and (7) is described in the above. However, the subject distances D0 and D7 can be obtained also by performing curve fitting on BVM0$i$ and BVM7$i$ and performing a digital calculation including the integration calculation as shown in the expressions (4) and (5). Therefore, in this specification, the approximate integration calculation as shown in the expressions (6) and (7) and the integration calculation as shown in the expressions (4) and (5) are generically called integration calculation.

As described above, the subject distances D0 and D7 are calculated by the expressions (6) and (7). At this time, the CPU 10$a$ of the first controller 10 performs a calculation processing to calculate the subject distance Da by performing a predetermined weight assignment processing on the two subject distances D0 and D7. Examples of the predetermined weight assignment processing include the following four types of weight assignment processings: a center-weighted type; a short-distance-weighted type; an exponential mean type; and an inverse exponential mean type.

The center-weighted-type weight assignment processing places more weight, for example, on the subject distance D7 obtained by the divisional cell C7 disposed in the vicinity of the substantial center of the light receiving surface of the metering sensor 20. For example, the subject distance Da is calculated by assigning to the subject distance D7 a weight three times that assigned to the subject distance D0 by the following expression (8):

$$Da = (D7 \times 3 + D0)/4 \quad (8)$$

The center-weighted-type weight assignment processing realizes a light adjustment control such that exposure is appropriate for, of the subjects to be shot, the subject situated in the vicinity of the substantial center of the image obtained by the actual shooting. That is, the center-weighted-type weight assignment processing is effective when the composition is adjusted so that the subject to be mainly shot (main subject) is situated in the vicinity of the substantial center of the shooting range confirmed through the finder FD.

The short-distance-weighted-type weight assignment processing places more weight on the short one of the subject distances D0 and D7. For example, the subject distance. Da is calculated by assigning to the relatively smaller one of the subject distances D0 and D7, a weight three times that assigned to the other subject distance by the following expression (9):

$$Da = \{MIN(D7,D0) \times 3 + MAX(D7,D0)\}/4 \qquad (9)$$

In the expression (9), MIN(D7,D0) means that the smaller one of D7 and D0 is adopted, and MAX(D7,D0) means that the larger one of D7 and D0 is adopted.

The short-distance-weighted-type weight assignment processing realizes a light adjustment control such that exposure is appropriate for, of the subjects to be shot, the subject present at a comparatively short distance from the image capturing apparatus 1. That is, the short-distance-weighted-type weight assignment processing is effective when the main subject is present at a comparative short distance from the image capturing apparatus 1.

The exponential-mean-type and inverse-exponential-mean-type weight assignment processings are introduced as processings with which exposure for a subject comparatively easily becomes appropriate by simulation. For example, in the exponential-mean-type weight assignment processing, the subject distance Da is calculated by the following expression (10) and in the inverse-exponential-mean-type weight assignment processing, the subject distance Da is calculated by the following expression (11):

$$Da = \log_2\{(2^{D7} + 2^{D0})/2\} \qquad (10)$$

$$Da = \log_2\{(2^{-D7} + 2^{-D0})/2\} \qquad (11)$$

In this description, the predetermined weight assignment processing as typified by the above-described four weight assignment processings can be performed according to the use and the design concept.

As described above, metering is performed with the divisional cell C0 that occupies the largest area of the light receiving surface of the light receiving portion and the divisional cell C7 disposed in the vicinity of the substantial center of the light receiving portion of the metering sensor 20. Then, by performing the predetermined weight assignment processing, even when the main subject is situated in various positions of the shooting range confirmed through the finder FD, an appropriate light adjustment control can be realized. In particular, by performing metering with the divisional cell C0, even when the main subject is disposed in various positions of the shooting range, light from the main subject can be captured. Consequently, an appropriate light adjustment control can be realized.

<Flow of the Actual Light Emission Amount Calculation Operation>

Figure 11:
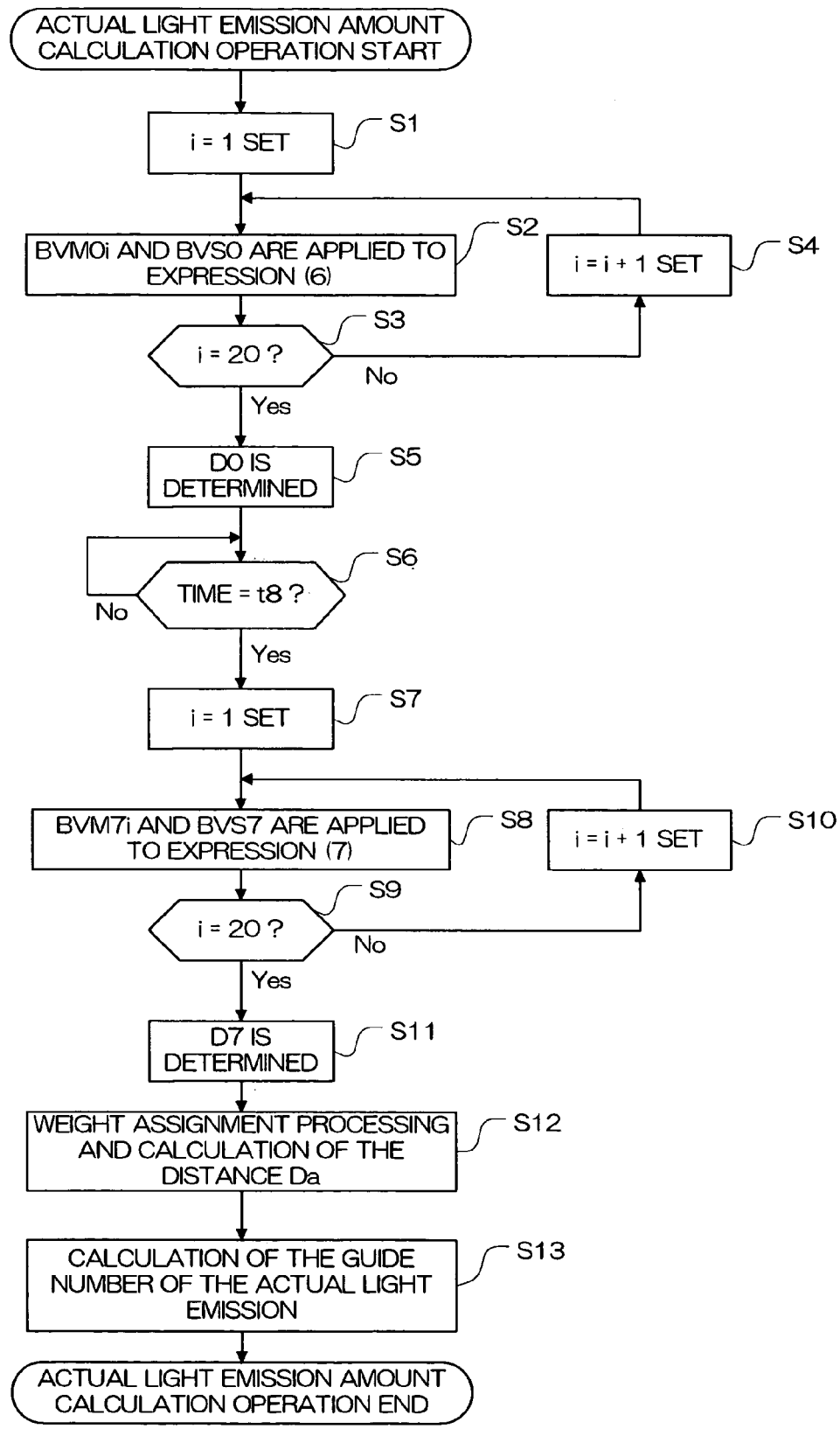
FIG. 11 is a flowchart showing the flow of an operation to calculate the actual light emission amount.

FIG. 11 is a flowchart showing the flow of an operation to calculate the actual light emission amount (in this description, the guide number). This flow is the calculation operation flow of the CPU 10a in the timing chart of FIG. 8. In this description, the BV value is stored into the RAM 10b twenty times in each of the first and second preliminary light emissions.

When the time t5 comes in the timing chart of FIG. 8, the flow of the actual light emission amount calculation operation of the CPU 10a in the first controller 10 is started, and the process proceeds to step S1.

At step S1, of the BV values (BVM0$i$) stored in the RAM 10b in the first preliminary light emission, the BV value (BVM01) stored at the i=1st time is set as the object of calculation, and the process proceeds to step S2.

At step S2, BV0$i$ stored in the RAM 10b in the first preliminary light emission and BVS0 stored in the RAM 10b when the shutter button is in the S1 condition are applied to the expression (6) to perform calculation, and the process proceeds to step S3.

At step S3, it is determined whether or not the calculation of step S2 is performed with the BV value stored at the i=20th time as the object of calculation. In this description, when the calculation of step S2 has not yet been performed with the BV value stored at the i=20th time as the object of calculation, the process proceeds to step S4. When the calculation of step S2 has already been performed with the BV value stored at the i=20th time as the object of calculation, the process proceeds to step S5.

At step S4, when the BV value that is set as the object of calculation at the immediately preceding step S2 is the one stored at the i-th time, the BV value stored at the i+1-th time is set as the next object of calculation, and the process returns to step S2. For example, when the BV value that is set as the object of calculation at the immediately preceding step S2 is the BV value stored at the first time (BVM01), the BV value stored at the second time (BVM02) is set as the next object of calculation.

That is, in this description, the subject distance D0 is calculated by applying the BV value successively stored at the i-th time (i=1,2,3, . . . ,20) (BVM0$i$) and BVS0 to the expression (6) by successively performing the first to twentieth processings of step S2.

At step S5, the calculation of step S2 has already been performed with the BV values stored at the i=1st to 20th times as the object of calculation. Therefore, the value calculated by the twenty processings of step S2 is determined to be the subject distance D0, and the process proceeds to step S6.

At step S6, it is determined whether the time t8 when the calculation of the subject distance D7 is started has come or not. In this description, the determination of step S6 is repeated until the time t8 comes, and when the time t8 comes, the process proceeds to step S7.

At step S7, of the BV values stored in the RAM 10b in the second preliminary light emission (BVM71), the BV value stored at the i=1st time (BVM71) is set as the object of calculation, and the process proceeds to step S8.

At step S8, the BV7$i$ stored in the RAM 10b in the second preliminary light emission and the BVS7 stored in the RAM 10b when the shutter button is in the S1 condition are applied to the expression (7) to perform calculation, and the process proceeds to step S9.

At step S9, it is determined whether or not the calculation of step S8 has been performed with the BV value stored at the i=20th time as the object of calculation. In this description, when the calculation of step S8 has not yet been performed with the BV value stored at the i=20th time as the object of calculation, the process proceeds to step S10. When the calculation of step S8 has already been performed with the BV value stored at the i=20th time as the object of calculation, the process proceeds to step S11.

At step S10, when the BV value that is set as the object of calculation at the immediately preceding step S8 is the one stored at the i-th time, the BV value stored at the i+1-th time is set as the next object of calculation, and the process returns to step S8. For example, when the BV value that is set as the object of calculation at the immediately preceding step S8 is the BV value stored at the first time (BVM71), the BV value stored at the second time (BVM72) is set as the next object of calculation.

That is, in this description, the subject distance D7 is calculated by applying the BV value successively stored at the i-th time (i=1,2,3, . . . ,20) (BVM7$i$) and BVS7 to the expression (7) by successively performing the first to twentieth processings of step S8.

At step S11, the calculation of step S8 has already been performed with the BV values stored at the i=1st to 20th times as the object of calculation. Therefore, the value calculated by the twenty processings of step S8 is set as the subject distance D7, and the process proceeds to step S12.

At step S12, a calculation processing is performed to calculate the subject distance Da by performing a predetermined weight assignment processing such as the above-described inverse-exponential-mean-type on the two subject distances D0 and D7 determined at steps S5 and S11, and the process proceeds to step S13.

At step S13, the guide number, that is, the light emission amount, of the actual light emission is calculated by applying the subject distance Da calculated at step S12 and a predetermined FNo to the expression (2), and the actual light emission amount calculation operation is ended.

Functional Structure of the Image Capturing System

Figure 12:
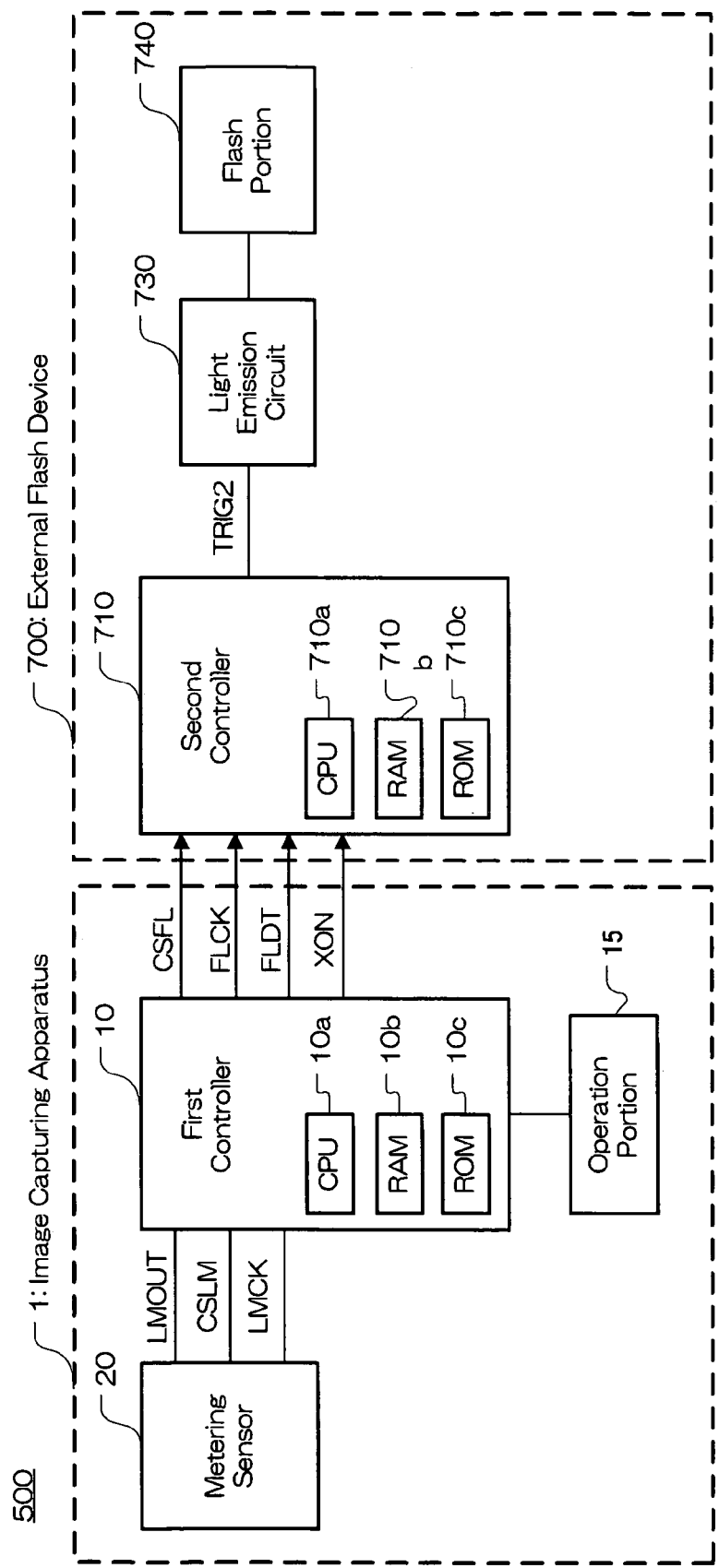
FIG. 12 is a block diagram showing a functional structure of the image capturing system.

FIG. 12 is a block diagram showing a functional structure of the image capturing system 500. In FIG. 12, the functional structure associated with the control to adjust the light emission amount (light adjustment control) of the external flash device 700 is shown. This light adjustment control is different from the light adjustment control to adjust the light emission amount of the built-in flash 40 only in that the flash to be fired is the external flash device 700. Therefore, in FIG. 12, similar elements to those of the functional structure associated with the light adjustment control to adjust the light emission amount of the built-in flash 40 are denoted by similar reference numerals, descriptions thereof are omitted, and different points will be mainly described.

The external flash device 700 comprises: a second controller 710 capable of receiving various control signals from the first controller 10; a flash portion 740 that emits light; and a flash light emission circuit 730 that controls the light emission of the flash portion 740 based on a trigger TRIG2 by the second controller 710.

The first controller 10 transmits to the second controller 710 a signal CSFL (chip select flash signal) to request the second controller 710 to accept various signals from the first controller 10, a clock FLCK (flash clock) for serial communication, data FLDT (flash data) that specifies the light emission amount (guide number) of the flash portion 740, and a signal XON that controls the start timing of the actual light emission. In this description, the clock FLCK serves also as a signal that provides an instruction to start the preliminary light emission, and the guide number associated with the preliminary light emission is preset to a predetermined value.

The second controller 710 comprises a CPU 710$a$, a RAM 710$b$ and a ROM 710$c$, and controls the light emission of the flash portion 740 based on various signals from the first controller 10. In the second controller 710, various functions can be realized by the CPU 710$a$ executing a program stored in the ROM 710$c$ comprising a flash memory or the like.

In the flash shooting with the firing of the external flash device 700, prior to the actual shooting, the light emission amount in the actual shooting (actual light emission amount) is obtained by the first controller 10 based on the metering signal LMOUT outputted from the metering sensor 20 under ambient light and the metering signal LMOUT outputted from the metering sensor 20 when the external flash device 700 performs preliminary light emission. Then, the data that: specifies the obtained actual light emission amount is transmitted from the first controller 10 to the second controller 710, and at the timing of the actual shooting, the trigger signal TRIG2 is outputted from the second controller 710 to the flash light emission circuit 730, whereby an appropriate light adjustment control can be performed.

<Light Adjustment Operation when the External Flash Device is Used>

Figure 13:
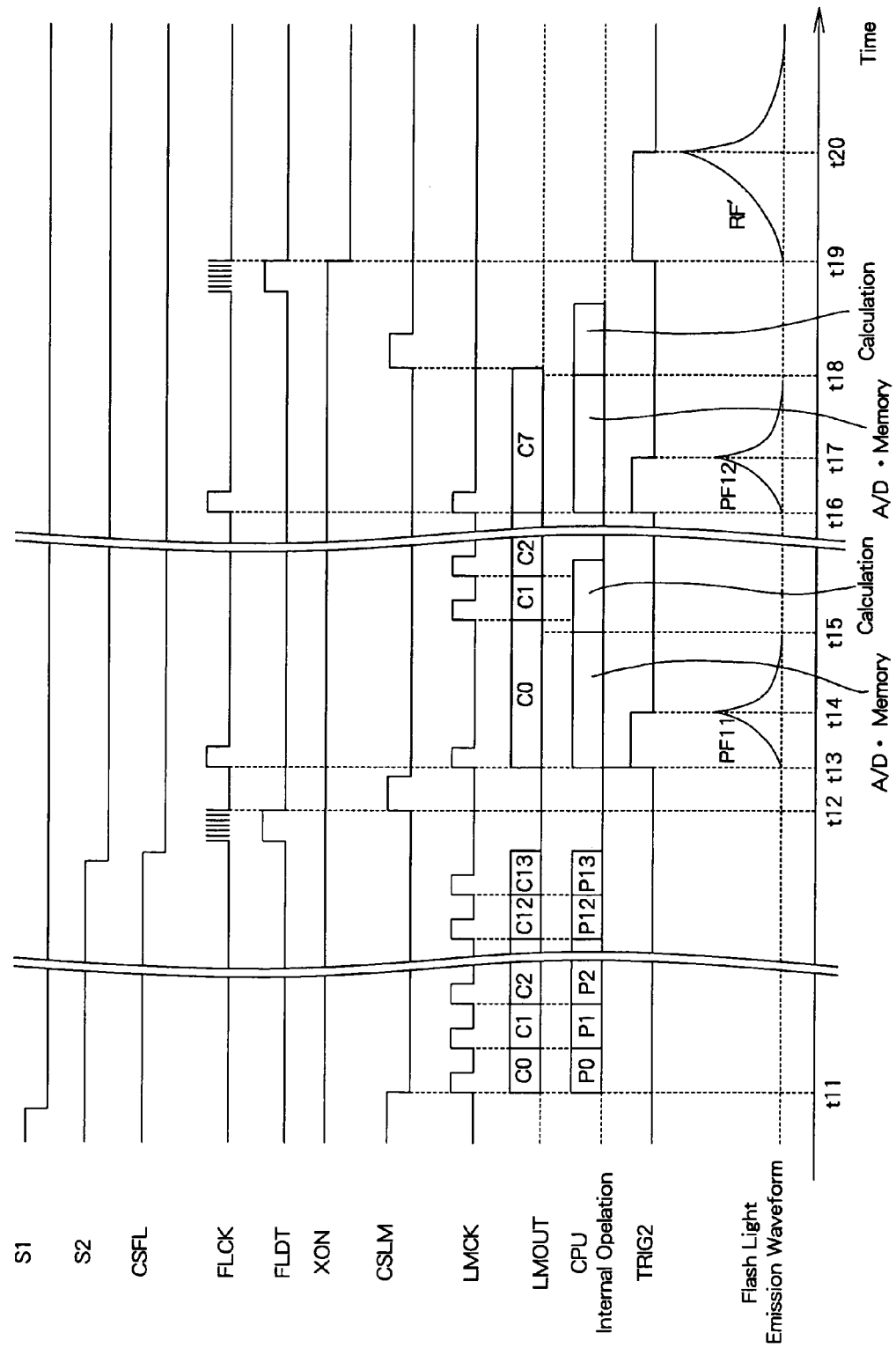
FIG. 13 is a timing chart showing the flow of a light adjustment control operation of an external flash device.

FIG. 13 is a timing chart showing the flow of a light adjustment control operation to adjust the actual light emission amount in the flash shooting using the external flash device 700. In this description, the metering using the two divisional cells C0 and C7 (pseudo two-segment metering) is performed like the light adjustment control using the built-in flash 40. Moreover, this light adjustment control operation flow is realized by the first controller 10 executing a program stored in the ROM 10$c$. Further, the aperture value (FNo) in the light adjustment control is set to a preset given value.

When the user half depresses the shutter button into the S1 condition as shown in FIG. 13 under a condition where the external flash device 700 is externally attached to the image capturing apparatus 1 and the image capturing apparatus 1 is set in the shooting mode, the level of the signal CSLM transmitted from the first controller 10 to the metering sensor 20 is changed from high to low, so that the metering sensor 20 starts the metering operation (time t11). The metering operation under ambient light when the shutter button is in the S1 condition is similar to that shown in FIG. 8, and therefore, no description thereof is given.

Then, when the user fully depresses the shutter button into the S2 condition, the level of the signal CSFL transmitted from the first controller 10 to the second controller 710 is changed from high to low, which enables the second controller 710 to accept various signals from the first controller 10. Then, the clock FLCK is transmitted from the first controller 10 to the second controller 710, and in synchronism with the clock FLCK, the data FLDT that specifies the guide number of the preliminary light emission is transmitted from the first controller 10 to the second controller 710.

Then, the level of the signal CSLM transmitted from the first controller 10 to the metering sensor 20 is momentarily changed from low to high and is soon returned to low. This level transition of the signal CSLM resets the number of clocks LMCK. Then, a preliminary light emission start signal is outputted from the first controller 10 to the second controller 710 and the clock LMCK is outputted from the first controller 10 to the metering sensor 20, whereby the divisional cell that outputs the metering signal LMOUT becomes the divisional cell C0 (times t12 to t13). Then, the metering signal LMOUT from the metering sensor 20 is outputted as the voltage level obtained by logarithmically compressing the current corresponding to the intensity (brightness) of the light received by the divisional cell C0.

When the divisional cell that outputs the metering signal LMOUT becomes the divisional cell C0, the trigger signal TRIG2 outputted from the second controller 710 to the flash light emission circuit 730 becomes high, so that the first preliminary light emission by the flash portion 740 is started (time t13). Then, the trigger signal TRIG2 is held high for a predetermined period in accordance with the preliminary light emission amount (specifically, the guide number) specified by the data FLDT from the first controller 10. Then, the trigger signal TRIG2 becomes low to end the first preliminary light emission.

The light emission waveform (the waveform representative of the intensity of the emitted light) in the first preliminary light emission is such that, like the waveform PF11 shown in FIG. 13, the intensity of the emitted light gradually increases while the trigger signal TRIG2 is held high (times t13 to t14). When the trigger signal TRIG2 becomes low, the intensity gradually decreases to end the first preliminary light emission.

In this description, in the metering sensor 20, the divisional cell that outputs the metering signal LMOUT is the divisional cell C0 during the first preliminary light emission. Then, while the flash portion 740 is emitting light, the metering sensor 20 outputs the metering signal LMOUT at predetermined time intervals ΔT. Then, the first controller 10 repeats an operation to successively A/D-convert the metering signal LMOUT and store it into the RAM 10b as the BV value which is the APEX value representative of the subject brightness (times t13 to t15).

As described above, instead of accumulating charges in a capacitor based on the current obtained in accordance with the brightness of the subject and measuring the amount of light from the subject at the time of flash emission, the brightness of the subject is treated as a voltage level at each moment in real time in the metering sensor 20.

After the end of the first preliminary light emission, the CPU 10a in the first controller 10 performs a calculation processing to calculate the distance (subject distance) D0 from the image capturing apparatus 1 to the subject based on the BV value under ambient light obtained when the shutter button is in the S1 condition and the BV value representative of the subject brightness which BV value is stored in the RAM 10b at the time of the first preliminary light emission.

On the other hand, in parallel with the subject distance calculation processing based on the first preliminary light emission, the clock LMCK is successively outputted from the first controller 10 to the metering sensor. 20, and the divisional cell that outputs the metering signal LMOUT becomes the divisional cell C7 (time t16). Then, the metering signal LMOUT from the metering sensor 20 is outputted as the voltage level obtained by logarithmically compressing the current corresponding to the intensity of the light received by the divisional cell C7.

When the divisional cell that outputs the metering signal LMOUT becomes the divisional cell C7, the preliminary light emission start signal is outputted from the first controller 10 to the second controller 710. Then, the trigger signal TRIG2 outputted from the second controller 710 to the flash light emission circuit 730 becomes high, so that the second preliminary light emission by the flash portion 740 is started (time t16). Then, the trigger signal TRIG2 is held high for a predetermined period in accordance with the light emission amount (specifically, the guide number) of the preliminary light emission specified by the data FLDT from the first controller 10. Then, the trigger signal TRIG2 becomes low to end the second preliminary light emission. In this description, the guide number is set so that the light emission amounts in the first and second preliminary light emissions are substantially the same.

The light emission waveform in the second preliminary light emission is such that, similarly to the light emission waveform in the first preliminary light emission, like the waveform PF12 shown in FIG. 13, the intensity of the emitted light gradually increases while the trigger signal TRIG2 is held high (times t16 to t17) and when the trigger signal TRIG2 becomes low, the intensity gradually decreases to end the second preliminary light emission.

In this description, like at the time of the first preliminary light emission, in the metering sensor 20, during the period of the second preliminary light emission, the divisional cell that outputs the metering signal LMOUT is the divisional cell C7. While the flash portion 740 is emitting light, the metering sensor 20 outputs the metering signal LMOUT at predetermined intervals ΔT. Then, the first controller 10 repeats the operation to successively A/D-convert the metering signal LMOUT and store it into the RAM 10b (times t16 to t18).

After the end of the second preliminary light emission, the CPU 10a in the first controller 10 performs a calculation processing to calculate the distance (subject distance) D7 from the image capturing apparatus 1 to the subject based on the BV value stored in the RAM 10b under ambient light which BV value is obtained when the shutter button is in the S1 condition and the BV value stored in the RAM 10b at the time of the second preliminary light emission.

After the subject distance D7 is obtained, the CPU. 10a of the first controller 10 performs a calculation processing to calculate the subject distance Da by performing a predetermined weight assignment processing on the two subject distances D0 and D7. The method of calculating the subject distances D0, D7 and Da in the flash shooting using the external flash device 700 will not be described because it is similar to the calculation method in the flash shooting using the built-in flash 40.

Then, the actual light emission amount (in this description, the guide number) is calculated by the CPU 10a of the first controller 10 performing a calculation applying the values to the expression (2). Then, the data FLDT that specifies the guide number of the actual light emission is transmitted from the first controller 10 to the second controller 710 in synchronism with the clock FLCK. For a period based on the transmitted guide number of the actual light emission, the trigger signal TRIG2 is outputted from the second controller 710 to the flash light emission circuit 730 (times t19 to t20). Thereby, the light adjustment control of the actual light emission by the external flash device 700 is realized. FIG. 13 shows the light emission waveform RF' of the actual light emission.

<Comparison with the Prior Art>

Now, differences between the image capturing apparatus 1 and the image capturing system 500 according to the embodiment of the present invention and the prior art will be described.

Figure 14:
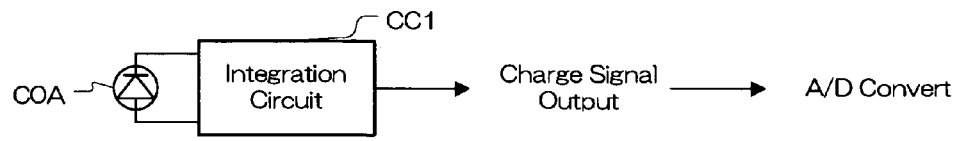
FIGS. 14 and 15 are views of assistance in explaining conventional metering sensors.
Figure 15:
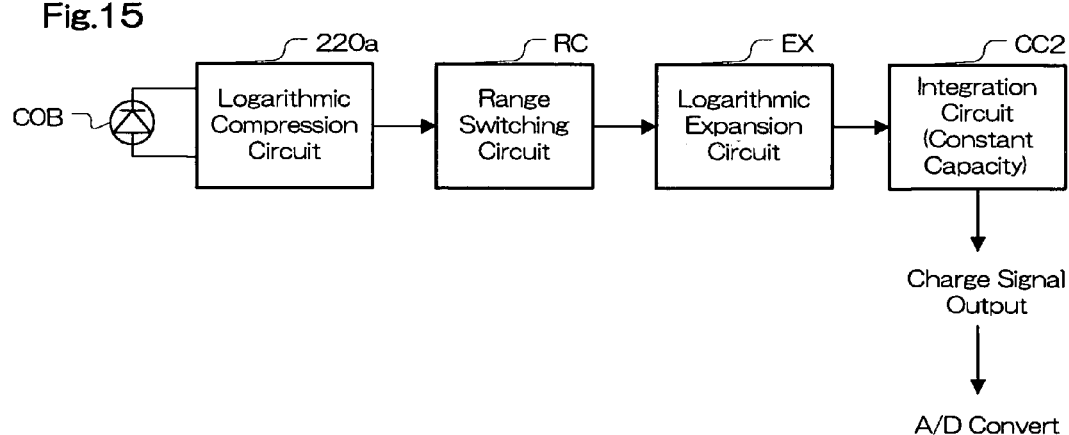

FIGS. 14 and 15 are views illustrating conventional light adjustment sensors. FIGS. 14 and 15 each show a functional structure paying attention to the output of the metering signal corresponding to one divisional area C0A or C0B of the areas (divisional areas) into which the light receiving portion of the light adjustment sensor is divided.

First, the conventional light adjustment sensor shown in FIG. 14 will be described.

As shown in FIG. 14, an integration circuit CC1 is provided for the divisional area C0A. When receiving light from the subject, the divisional area C0A outputs a photocurrent proportional to the intensity of the light to the integration circuit CC1. The integration circuit CC1 comprises a capacitor such as a condenser, and for a predetermined period during which the amount of light from the subject is to be measured (for example, the period of the preliminary light emission prior to the actual shooting), the integration circuit CC1 accumulates charges corresponding to the current from the divisional area C0A. Then, the accumulated charges are outputted to a controller (not shown) as analog charge signals, undergo processing such as A/D conversion, and are applied to the actual light emission amount calculation processing.

In this type of light adjustment sensor, it is necessary to set the capacitance of the capacitor provided in the integration circuit CC1 on the assumption that the intensity of the light from the subject is high. However, when the intensity of the light from the subject is low, for example, the amount of charges accumulated at the time of the preliminary light emission is too small, so that only a small part of the range where the A/D conversion is possible (dynamic range) is used. Consequently, a minute change in charge amount cannot be detected, so that the accuracy of the value after the A/D conversion is degraded. That is, the accuracy of the light adjustment control is degraded.

Therefore, a method is considered in which a plurality of capacitors having different capacities is provided for the integration circuit CC1 and by switching the capacitor (switching the range) according to the setting of the ISO sensitivity, most of the dynamic range of the A/D conversion is put to use, whereby the accuracy of the value after the A/D conversion is improved. However, in the structure switching the capacitor, since the circuit structure of the light adjustment sensor is complicated, cost increases and the operation and the judgment regarding the switching of the capacitor are difficult.

Next, the conventional light adjustment sensor shown in FIG. 15 will be described.

As shown in FIG. 15, a logarithmic compression circuit 220*a*, a range switching circuit RC and a logarithmic expansion circuit EX are provided for the divisional area C0B.

When receiving light from the subject, the divisional area C0B outputs a photocurrent proportional to the light intensity to the logarithmic compression circuit 220*a*. Then, the photocurrent is logarithmically compressed by the logarithmic compression circuit 220*a* into a voltage and outputted to the range switching circuit RC.

The range switching circuit RC appropriately amplifies the voltage in accordance with the ISO sensitivity that is set based on the user's setting operation, and outputs the amplified voltage to the logarithmic expansion circuit EX.

The logarithmic expansion circuit EX converts the voltage into a current by a logarithmic expansion processing in the opposite direction to the logarithmic compression processing, and outputs the current to the integration circuit CC2.

The integration circuit CC2 comprises a capacitor such as a condenser, and accumulates charges corresponding to the current from the logarithmic expansion circuit EX for a predetermined period during which the amount of light from the subject is to be measured (for example, the period of the preliminary light emission prior to the actual shooting). Then, the accumulated charges are outputted to a controller (not shown) as analog charge signals. Then, it undergoes a processing such as A/D conversion at the controller, and are applied to the actual light emission amount calculation processing.

In this type of light adjustment sensor, by making a setting so that charges are accumulated in most of the capacitance of the capacitor by an amplification processing by the range switching circuit RC and using most of the dynamic range of the A/D conversion, the accuracy of the value after the A/D conversion can be improved. However, an operation is necessary such that the user appropriately sets the ISO sensitivity in consideration of the capacitance of the capacitor in accordance with the intensity of the light from the subject. Consequently, the operation is complicated, and the judgment regarding the switching of the ISO sensitivity is difficult. Moreover, the structure of the hardware is also complicated.

As described above, in the conventional light adjustment sensors, since the integration circuit comprising a capacitor that is hardware is provided, the accuracy of the light adjustment control is degraded by the capacitance of the capacitor. Moreover, since the capacitance of the capacitor has a predetermined range, a complicated and difficult operation such as the switching of the range is necessary. Further, a special circuit structure such as the integration circuit and a circuit for switching the range is necessary. Consequently, the disadvantage in operability and cost is great.

On the contrary, in the image capturing apparatus 1 according to the embodiment of the present invention, instead of accumulating charges corresponding to the current obtained in accordance with the brightness of the subject in a capacitor and measuring the amount of reflected light from the subject at the time of flash light emission, the brightness of the subject is treated as a voltage value at each moment in real time. Then, after the voltage value is A/D-converted, the actual light emission amount calculation processing can be performed by a digital calculation including an integration calculation.

That is, in the image capturing apparatus 1 according to the embodiment of the present invention, since a processing equivalent to the integration circuit is realized by a digital calculation, problems caused by predetermined hardware such as the limitation of the capacitance of the capacitor and the dynamic range can be avoided. That is, there is no specific limitation on the integration calculation in the digital calculation because it is mere an addition of numbers, and it never occurs that the accuracy of the value after the A/D conversion is degraded to degrade the accuracy of the light adjustment control. In particular, a complicated and difficult operation such as the switching of the range is unnecessary. Further, since a special circuit structure such as the integration circuit and a circuit for switching the range is unnecessary, the cost of manufacturing can be reduced.

Moreover, in the image capturing apparatus 1 according to the embodiment of the present invention, the metering sensor is used for the light amount measurement in the light adjustment control and a light adjustment sensor is not separately provided. For this reason, the number of sensors which are hardware can be reduced. Consequently, the number of process steps such as the adjustment and correction of the sensor in the manufacturing process can be reduced as well as cost can be reduced.

As described above, in the image capturing apparatus 1 or the image capturing system 500 according to the embodiment of the present invention, the BV value under ambient light obtained when the shutter button is in the S1 condition is stored into the ROM 10*b* immediately before the actual shooting in the light adjustment control using the built-in flash 40 or the external flash device 700. Then, when the shutter button is depressed into the S2 condition, in the first and second preliminary light emissions, the first controller 10 converts the analog metering signal LMOUT (voltage level) varying with time in accordance with the intensity of the light from the subject, to a plurality of pieces of digital data representative of the BV values corresponding to the brightness of the subject in time sequence, and stores the digital data into the RAM 10*b*. Then, the first controller 10 calculates the value for determining the light emission amount in the actual light emission (in this case, the subject distance) by applying the obtained plurality of BV values to the expressions (6) and (7), that is, by performing the digital calculation including the integration calculation of the value obtained by logarithmically expanding the plurality of BV values stored in the RAM 10*b*. Then, by calculating the light emission amount in the actual light emission based on the subject distance, the light adjustment control is realized.

By adopting this structure, the value for determining the light emission amount in the actual light emission can be accurately calculated without a light adjustment sensor being specifically provided and without an integration circuit being provided in the metering sensor. Consequently, an image capturing apparatus and a image capturing system being inexpensive and capable of highly accurate flash light adjustment control can be provided.

Moreover, the light receiving portion of the metering sensor 20 is divided into a plurality of divisional areas, and the metering sensor 20 outputs the analog metering signal LMOUT varying with time in accordance with the intensity of the light from the subject received by each divisional area. Then, the built-in flash 40 or the external flash device 700 performs preliminary light emission a plurality of times before the actual shooting, and the value for determining the light emission amount in the actual light emission is calculated based on the analog metering signal outputted from the metering sensor 20 while varying with time in accordance with the intensity of the light from the subject received by the divisional cells that are different from each other in each preliminary light emission.

By adopting this structure, a metering sensor used for the conventional multi-segment metering adopting the method in which the analog metering signals corresponding to the divisional areas are outputted not in parallel but in time sequence can be applied to the metering sensor 20. Consequently, an inexpensive and highly accurate flash light adjustment control can be performed.

<Modification>

While the embodiment of the present invention has been described, the present invention is not limited to one having the above-described contents.

For example, in the above-described embodiment, in the light adjustment control, the first and second preliminary light emissions are performed prior to the actual shooting, the subject distances D0 and D7 are calculated, and the subject distance Da is calculated by performing the weight assignment processing on the subject distances D0 and D7. However, the present invention is not limited thereto; for example, it may be performed to perform only the first preliminary light emission prior to the actual light emission, calculate the subject distance D0 and treat the subject distance D0 as the subject distance Da.

That is, the following may be performed: In the first preliminary light emission, the metering sensor 20 outputs in time sequence the analog metering signal LMOUT varying with time according to the intensity of the light from the subject which light is received by, of the plurality of divisional cells C0 to C13, the divisional cell C0 whose object of metering is the subject that is present in a relatively wide area. Then, the first controller 10 converts the analog metering signal LMOUT to digital form in time sequence, and generates a plurality of pieces of digital metering data corresponding to the brightness of the subject.

By adopting this structure, for example, the main subject can be easily included in the object of metering in a single preliminary light emission. Consequently, a highly accurate light adjustment control can be realized in a single preliminary light emission.

Figure 16:
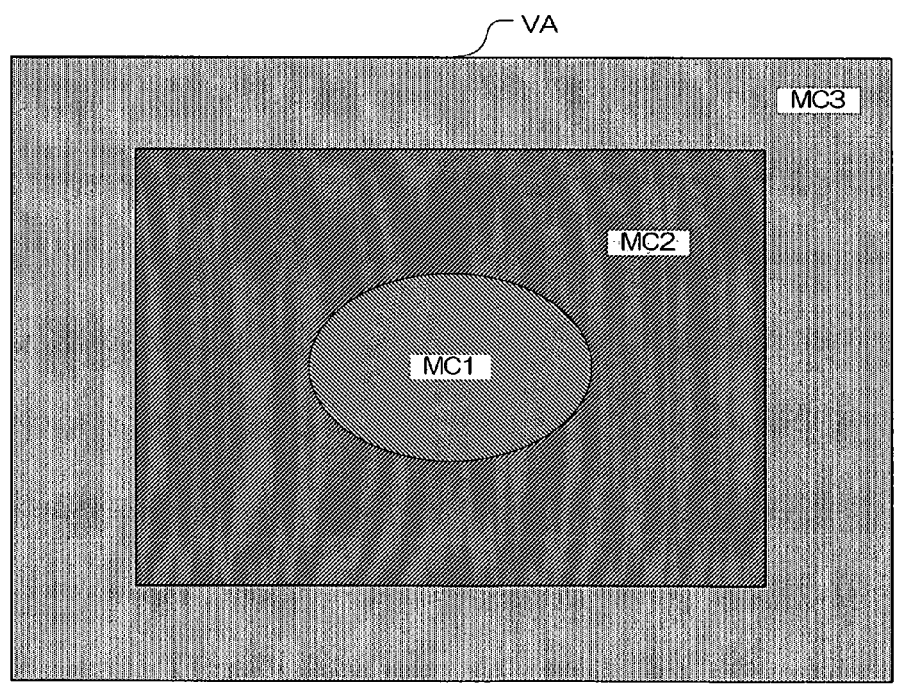
FIG. 16 is a view showing a modification of the method of cell division of the metering sensor.
Figure 17:
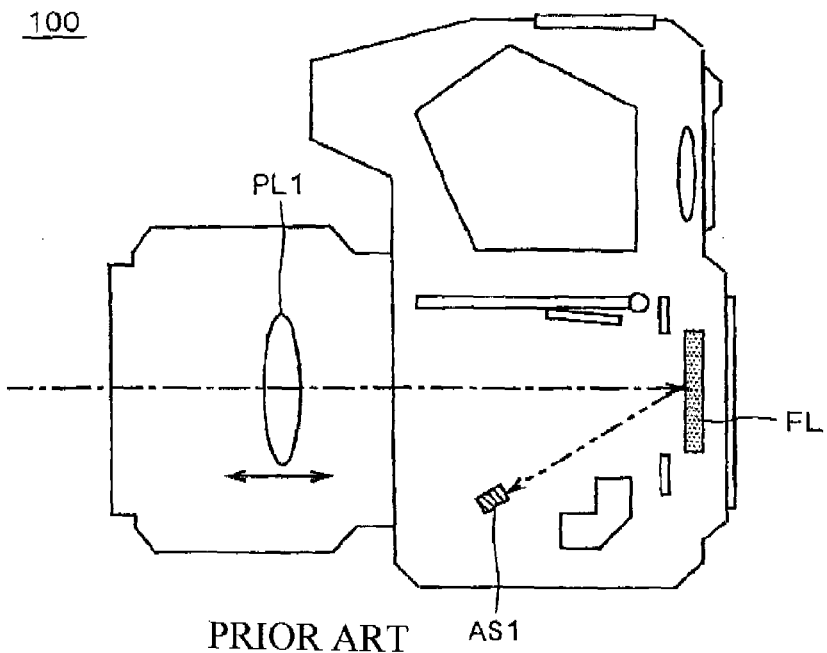
FIG. 17 is a cross-sectional view showing the light adjustment method in the conventional film-based single-lens reflex camera.
Figure 18:
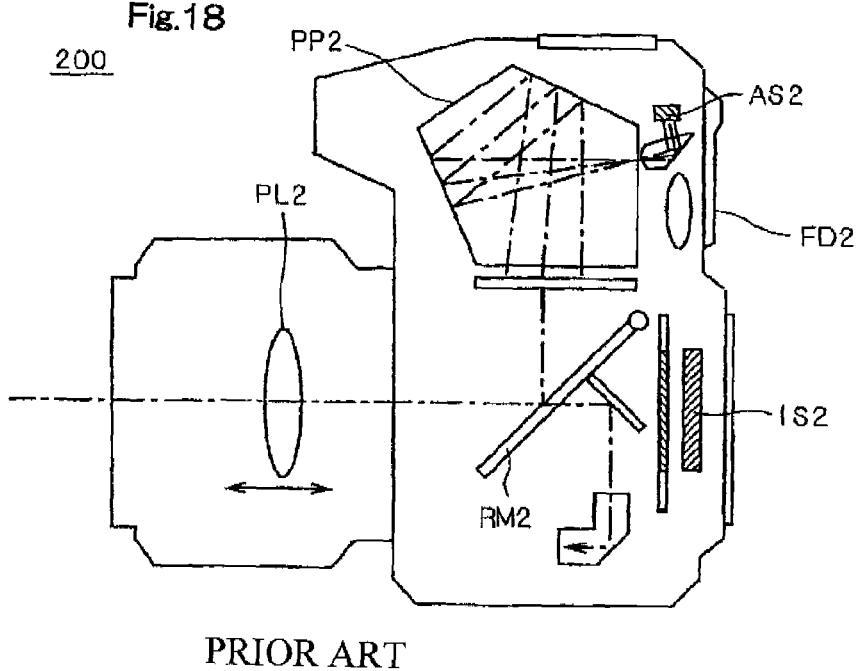
FIGS. 18 and 19 are cross-sectional views showing the light adjustment methods in the conventional digital single-lens reflex cameras.
Figure 19:
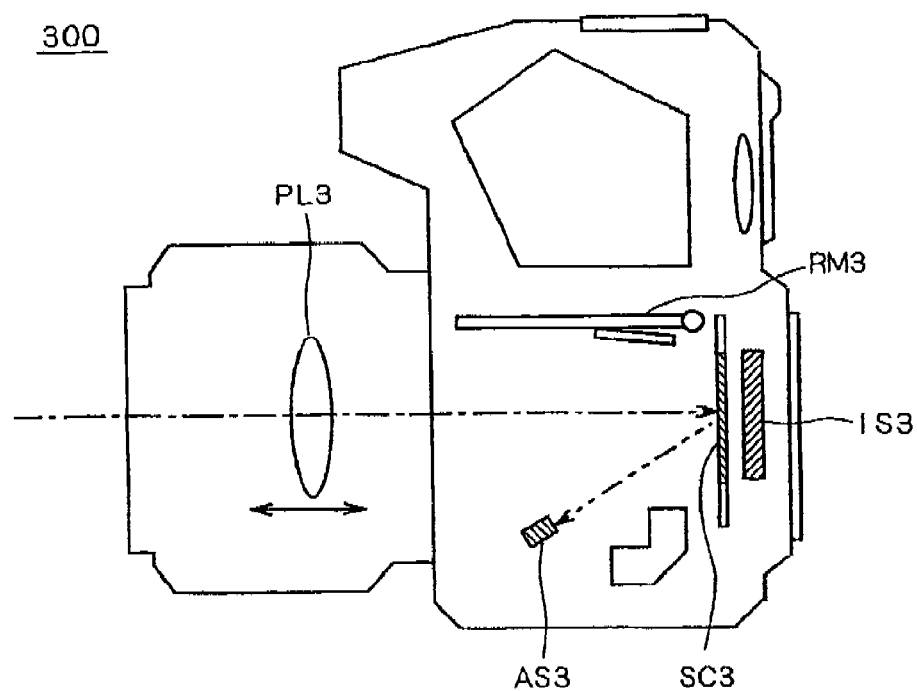

Moreover, in the above-described embodiment, as shown in FIGS. 3 and 4, the light receiving portion of the metering sensor 20 is divided into the fourteen divisional cells C0 to C13. However, the present invention is not limited thereto; for example, it may be performed to, as shown in FIG. 16, divide the light receiving portion of the metering sensor into three areas (divisional cells) MC1 to MC3 and perform metering with the optical image VA of the subject received by the light receiving portion being divided into three areas (divisional areas). By thus performing metering by the metering sensor with the light receiving portion being divided in various forms, metering and weight assignment processing can be performed in accordance with various subject conditions such as the size and configuration of the subject.

Moreover, in the above-described embodiment, various signals can be transmitted between the external flash device 700 and the image capturing apparatus 1 by attaching the external flash device 700 to the flash attachment portion FA of the image capturing apparatus 1. However, the present invention is not limited thereto; for example, the transmission of various signals between the image capturing apparatus 1 and the external flash device 700 may be performed by radio by the mode setting of the image capturing apparatus 1.

Moreover, in the above-described embodiment, the number of times of output of the metering signal LMOUT in one preliminary light emission is twenty times. However, the present invention is not limited thereto; various number of times such as thirty times may be adopted. However, to reduce the error due to the approximation when the calculations shown in the expressions (6) and (7) are performed to approximately calculate the integration shown in the expressions (4) and (5), it is preferable that the number of times of output per predetermined period be as large as possible.

Moreover, in the above-described embodiment, the image capturing apparatus 1 is a digital single-lens reflex camera. However, the object of the present invention is not limited to digital cameras, but film-based single-lens reflex cameras may also be the object of the present invention.

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. An image capturing apparatus comprising:
   a metering sensor for measuring a brightness of a subject;
   a light emitter;
   a light emitting controller for controlling the light emitter to perform a preliminary light emission of a predetermined light amount before a shooting;
   a data generator for generating a plurality of pieces of digital metering data by converting to digital form in time sequence an analog metering signal outputted from the metering sensor while varying with time during the preliminary light emission;

a memory for storing the plurality of pieces of digital metering data successively generated by the data generator; and a calculator for calculating a light emission amount for the shooting by a digital calculation including an integration calculation of the plurality of pieces of digital metering data stored in the memory.

2. The image capturing apparatus according to claim 1, wherein a light receiving portion of the metering sensor is divided into a plurality of divisional areas, and wherein the metering sensor outputs the analog metering signal varying with time in accordance with an intensity of light received by each divisional area.

3. The image capturing apparatus according to claim 2, wherein the light emitting controller controls the light emitter to perform the preliminary light emission a plurality of number of times before the shooting.

4. The image capturing apparatus according to claim 3, wherein, during the plurality of preliminary light emissions, the data generator generates the plurality of pieces of digital metering data by converting to digital form in time sequence the analog metering signal outputted from the metering sensor while varying with time in accordance with the intensity of the light received by the divisional areas that are different from each other.

5. The image capturing apparatus according to claim 3, wherein, during the preliminary light emission, the data generator generates the plurality of pieces of digital metering data by converting to digital form in time sequence the analog metering signal outputted from the metering sensor while varying with time in accordance with the intensity of light received by, of the plurality of divisional areas, a divisional area whose object of metering is a subject that is present in a relatively wide area.

6. The image capturing apparatus according to claim 3, wherein, during the preliminary light emission, the data generator generates the plurality of pieces of digital metering data by converting to digital form in time sequence the analog metering signal outputted from the metering sensor while varying with time in accordance with the intensity of light received by, of the plurality of divisional areas, a divisional area that occupies the largest area of a light receiving surface of the light receiving portion.

7. The image capturing apparatus according to claim 1, wherein the image capturing apparatus is single lens reflex camera.

8. An image capturing system having an image capturing apparatus and light emitter that emits light to a subject based on a signal from the image capturing apparatus, the image capturing system comprising:

a metering sensor for measuring a brightness of a subject;

a light emitter;

a light emitting controller for controlling the light emitter to perform a preliminary light emission of a predetermined light amount before a shooting;

a data generator for generating a plurality of pieces of digital metering data by converting to digital form in time sequence an analog metering signal outputted from the metering sensor while varying with time during the preliminary light emission;

a memory for storing the plurality of pieces of digital metering data successively generated by the data generator; and a calculator for calculating a light emission amount for the shooting by a digital calculation including an integration calculation of the plurality of pieces of digital metering data stored in the memory.

9. The image capturing apparatus according to claim 8, wherein a light receiving portion of the metering sensor is divided into a plurality of divisional areas, and wherein the metering sensor outputs the analog metering signal varying with time in accordance with an intensity of light received by each divisional area.

10. The image capturing apparatus according to claim 9, wherein the light emitting controller controls the light emitter to perform the preliminary light emission a plurality of number of times before the shooting.

11. The image capturing apparatus according to claim 10, wherein, during the plurality of preliminary light emissions, the data generator generates the plurality of pieces of digital metering data by converting to digital form in time sequence the analog metering signal outputted from the metering sensor while varying with time in accordance with the intensity of the light received by the divisional areas that are different from each other.

12. The image capturing apparatus according to claim 10, wherein, during the preliminary light emission, the data generator generates the plurality of pieces of digital metering data by converting to digital form in time sequence the analog metering signal outputted from the metering sensor while varying with time in accordance with the intensity of light received by, of the plurality of divisional areas, a divisional area whose object of metering is a subject that is present in a relatively wide area.

13. The image capturing apparatus according to claim 10, wherein, during the preliminary light emission, the data generator generates the plurality of pieces of digital metering data by converting to digital form in time sequence the analog metering signal outputted from the metering sensor while varying with time in accordance with the intensity of light received by, of the plurality of divisional areas, a divisional area that occupies the largest area of a light receiving surface of the light receiving portion.

14. The image capturing apparatus according to claim 8, wherein the image capturing apparatus is single lens reflex camera, and wherein the light emitter is externally attachable to the image capturing apparatus.

15. A method of a light emitting control of an image capturing apparatus, comprising the steps of:

emitting a preliminary light of a predetermined light amount before a shooting;

measuring a brightness of a subject by a metering sensor;

generating a plurality of pieces of digital metering data by converting to digital form in time sequence an analog metering signal outputted from the metering sensor while varying with time during the preliminary light emission;

storing the plurality of pieces of digital metering data successively generated;

calculating a light emission amount for the shooting by a digital calculation including an integration calculation of the plurality of pieces of digital metering data stored; and emitting a light for the shooting based on the calculated light emission amount.

* * * * *